US006928577B2

(12) United States Patent
Moser et al.

(10) Patent No.: US 6,928,577 B2
(45) Date of Patent: Aug. 9, 2005

(54) CONSISTENT MESSAGE ORDERING FOR SEMI-ACTIVE AND PASSIVE REPLICATION

(75) Inventors: Louise E. Moser, Santa Barbara, CA (US); Peter M. Melliar-Smith, Santa Barbara, CA (US)

(73) Assignee: Eternal Systems, Inc., San Jose, CA (US)

( * ) Notice: Subject to any disclaimer, the term of this patent is extended or adjusted under 35 U.S.C. 154(b) by 0 days.

(21) Appl. No.: 10/631,022

(22) Filed: Jul. 29, 2003

(65) Prior Publication Data

US 2004/0103342 A1 May 27, 2004

Related U.S. Application Data

(60) Provisional application No. 60/399,580, filed on Jul. 29, 2002.

(51) Int. Cl.$^7$ ................................................. G06F 11/00
(52) U.S. Cl. ................................. 714/4; 714/6; 714/12
(58) Field of Search ........................... 714/4, 6, 12, 15, 714/16

(56) References Cited

U.S. PATENT DOCUMENTS

| | | | | |
|---|---|---|---|---|
| 4,725,834 A | | 2/1988 | Chang et al. | |
| 5,657,440 A | * | 8/1997 | Micka et al. | ................ 714/16 |
| 5,799,146 A | | 8/1998 | Badovinatz et al. | |
| 5,941,999 A | * | 8/1999 | Matena et al. | ................ 714/6 |
| 6,035,415 A | | 3/2000 | Fleming | |
| 6,178,441 B1 | | 1/2001 | Elnozahy | |
| 6,247,141 B1 | | 6/2001 | Holmberg | |
| 6,671,821 B1 | | 12/2003 | Castro et al. | |
| 2001/0037398 A1 | * | 11/2001 | Chao et al. | ................ 709/230 |
| 2002/0032883 A1 | * | 3/2002 | Kampe et al. | ................ 714/16 |
| 2002/0099973 A1 | * | 7/2002 | Moser et al. | ................ 714/11 |
| 2004/0078618 A1 | * | 4/2004 | Moser et al. | ................ 714/3 |

OTHER PUBLICATIONS

Microsoft Computer Dictionary, Fourth Edidiadion, Microsoft Press, 1999, pp. 248, 382, 436–437, and 456.*

Jungmaier, et al., SCTP—A Multi–link End–to–end Protocol for IP–based Networks, International Journal of Electronics and communications, published 2001, pp. 46–54.*

"Operating Systems I Process Scheduling", published 1999; Scheduling link located on the following website http://www.cs.wpi.edu/~claypool/courses/3013–A99/.*

Gantman et al., "Scheduling Real–Time Tasks in Distributed Ssystems: A Survey", Submitted for OSSurveyF98, published 1998, pp. 1–13; http://www.cse.ucsd.edu/classes/fa98/cse221/OSSurveyF98.*

Kaashoek et al., "Group Communication in the Amoeba Distributed Operating System", proceedings of the IEEE 11th International Conference on Distributed Computing Systems, Kasshoek et al. (continued from above)–Arlington, TX, May 1991, pp. 220–230.

Moser et al., Totem: A Fault–Tolerant Multicast Group Communication System, Communications of the ACM, vol. 39, No. 4, Apr. 1996, pp. 54–63.

* cited by examiner

Primary Examiner—Bryce P. Bonzo
Assistant Examiner—Joshua Lohn
(74) Attorney, Agent, or Firm—John P. O'Banion

(57) ABSTRACT

Mechanisms for achieving consistent message ordering within a fault-tolerant distributed computer system based on semi-active or passive replication are described. The mechanisms communicate message ordering information from the primary replica to its backup replicas in such a way as to minimize the end-to-end request/response time, to minimize the number of additional messages that are multicast, and to ensure that, in the event of a fault, a backup replica has, or can obtain, the messages and the message ordering information that it needs to reproduce the actions of the primary replica.

64 Claims, 11 Drawing Sheets

US 6,928,577 B2

CONSISTENT MESSAGE ORDERING FOR SEMI-ACTIVE AND PASSIVE REPLICATION

CROSS-REFERENCE TO RELATED APPLICATIONS

This application claims priority from U.S. provisional application Ser. No. 60/399,580 filed on Jul. 29, 2002, incorporated herein by reference.

STATEMENT REGARDING FEDERALLY SPONSORED RESEARCH OR DEVELOPMENT

This invention was made with Government support under Grant No. 70NANBOH3015 awarded by the US Department of Commerce, National Institute of Standards & Technology. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public file or record of the United States Patent and Trademark Office, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The invention relates generally to software-based fault-tolerant computer systems based on the replication of objects, using semi-active or passive replication. More specifically, it relates to communication of messages to the replicas of an object and the delivery of messages reliably and in the same order to all of the replicas of the object.

2. Incorporation by Reference

The following patents and publications are incorporated herein by reference:

Patents

U.S. Pat. No. 4,725,834
U.S. Pat. No. 5,799,146
U.S. Pat. No. 6,035,415
U.S. Pat. No. 6,178,441
U.S. Pat. No. 6,247,141

Publications

D. Powell, ed., Delta-4: A Generic Architecture for Dependable Distributed Computing, Research Reports ESPRIT, Springer-Verlag, Berlin, 1991.

K. P. Birman and R. van Renesse, Reliable Distributed Computing with the Isis Toolkit, IEEE Computer Society Press, 1994.

M. F. Kaashoek and A. S. Tanenbaum, "Group communication in the Amoeba distributed operating system," Proceedings of the IEEE 11th International Conference on Distributed Computing Systems, Arlington, Tex., May 1991, pp. 220–230.

Y. Amir, L. E. Moser, P. M. Melliar-Smith, D. A. Agarwal and P. Ciarfella, "The Totem single-ring ordering and membership protocol," ACM Transactions on Computer Systems, vol. 13, no. 4, November 1995, pp. 311–342.

L. E. Moser, P. M. Melliar-Smith, D. A. Agarwal, R. K. Budhia and C. A. Lingley-Papadopoulos, "Totem: A fault-tolerant multicast group communication system," Communications of the ACM, vol. 39, no. 4, April 1996, pp. 54–63.

3. Description of Related Art

Fault-tolerant systems are based on entity redundancy (replication) to mask faults and, thus, to provide continuous service to their users. In software fault tolerance, the entities that are replicated are the objects of the application programs. In this invention, the term object is used to refer generally to objects, processes, containers, components, memory protection domains or processors.

A multicast connection is a communication channel between the replicas of a first object and the replicas of a second object. A multicast connection can communicate messages of several different kinds, including TCP messages, SCTP messages, UDP messages, and remote procedure calls. The techniques of wrapping and library interpositioning can be used to divert messages of these various kinds from the standard protocol stacks to the mechanisms that provide multi-cast connections. Typically, a replicated object participates in multiple multicast connections. Each replicated object has one distinguished multicast connection for a local connection that provides communication among the replicas of the object.

Distributed systems allow the replicas of an object to be hosted on different computers to provide fault tolerance. In a distributed system, a client object invokes a method of a server object by sending a request message containing the method invocation and by receiving a reply message from that server containing the result of the method invocation. Request and reply messages can be synchronous, in which case the client blocks waiting for a reply from the server, or asynchronous, in which case the client can perform other operations without waiting for the reply. A one-way message is a message for which there is no corresponding reply. Although the mechanisms of this invention are described in terms of clients and servers, the mechanisms are general; an object can act as both a client and a server and, thus, the objects can be thought of as peers.

Fault-tolerant systems support applications that are replicated using active, semi-active and passive replication. In active replication, all of the replicas are equal and all of them execute the methods invoked on the replicated object. In semi-active or passive replication, one of the replicas is distinguished as the primary replica and the other replicas are backup replicas. In semi-active replication (see, e.g., FIG. 1), the backup replicas receive and log the request and reply messages, perform the operations, but do not multicast request or reply messages. In passive replication (see, e.g., FIG. 2), the backup replicas receive and log the request and reply messages, but do not perform the operations and do not multicast the request or reply messages. This invention addresses distributed systems that provide fault tolerance using semi-active or passive replication.

To achieve strong replica consistency, the replicas of an object must process the messages containing the method invocations in the same order (linear sequence). Because processors operate asynchronously, because messages are received asynchronously, and because messages might be lost and thus have to be retransmitted, messages might not be received in the same order as they were multicast originally and, thus, they might not be processed in the same order, unless that order is enforced by specific mechanisms.

Some mechanisms for message ordering (see, e.g., D. Powell, ed., "Delta-4: A Generic Architecture for Dependable Distributed Computing", Springer-Verlag, 1991, incorporated herein by reference) incur loss of message ordering information under fault conditions, resulting in a system in which a backup replica cannot take over where the faulty primary left off. Other mechanisms for message ordering (see, e.g., U.S. Pat. Nos. 5,799,146, 6,035,415, 6,247,141, and 4,725,583, each of which is incorporated herein by reference; K. P. Birman and R. van Renesse, "Reliable Distributed Computing with the Isis Toolkit", IEEE Computer Society Press, 1994, incorporated herein by reference; M. F. Kaashoek and A. S. Tanenbaum, "Group communication in the Amoeba distributed operating systems," Proceedings of the IEEE 11th International Conference on Distributed Computing Systems, Arlington, Tex., May 1991, pp. 220–230, incorporated herein by reference; and L. E. Moser, P. M. Melliar-Smith, D. A. Agarwal, R. K. Budhia and C. A. Lingley-Papadopoulos, "Totem: A fault-tolerant multicast group communication system," Communications of the ACM, vol. 39, no. 4, April 1996, pp. 54–63, incorporated herein by reference) for enforcing a message delivery order delay messages until the order is established, or require additional messages to be transmitted, increasing the end-to-end request/response time and/or wasting network bandwidth.

In semi-active or passive replication, the primary replica of an object determines the order in which messages are delivered to the application and communicates that message ordering information to the backup replicas of the object. The order in which a primary replica delivers and processes a message must be communicated to the backup replicas either before, or concurrently with, the primary replica's transmitting a reply to the client. When the primary replica fails, a backup replica is promoted to be the new primary replica. The new primary replica loads, or has already loaded, a checkpoint and then processes the messages containing the method invocations in the same order as the old primary replica processed them before it became faulty.

FIG. 3 shows a primary replica S1 of a server object S processing request messages m1, m2, m3 and m4. In FIG. 3, the primary replica S1 has processed the request messages m1 and m2 in that order, and has multicast the corresponding reply messages. The primary replica S1 is processing request message m3 when it fails, and does not process request message m4. Thus, FIG. 3 shows a backup replica S2 processing messages m1 and m2 in the same order as the primary replica S1 processed them. The processing of request message m3 by the primary replica S1 has not yet resulted in communication of any information outside of the, now faulty, primary replica S1. Thus, the backup replica S2 can process the request messages m3 and m4 in any order. FIG. 3 shows that S2 processed m4 before m3.

FIG. 4 shows a variation of the scenario shown in FIG. 3, where the primary replica S1, while processing request message m3, multicasts a message n1 containing a method invocation of another object T before it fails. Request message n1 might communicate information about the ordering of request message m3. Consequently, S1 must communicate the message ordering information for m3 to its backup replicas either before or concurrently with the transmission of n1. During its processing of the request message m3, the new primary replica S2 must recognize that S1 had already invoked the method of T contained in message n1 and, thus, must not invoke that method again; rather, it must extract T's reply from the message log or, otherwise, must wait for the reply from T. Otherwise, if T processes that method invocation twice, it might lead to corruption of T's state and the return of incorrect results to S2.

Consequently, once a primary replica starts processing a message, it must communicate the message ordering information for that message to the backup replicas either before or concurrently with the primary replica's multicasting a message, whether that message is a reply to a client or a request to another server.

A typical strategy (see, e.g., D. Powell, ed., "Delta-4: A Generic Architecture for Dependable Distributed Computing", Springer-Verlag, 1991, which is incorporated herein by reference) for communicating message ordering information to the backup replicas involves the primary replica's creating a message containing the ordering information and transmitting that information to the backup replicas. Such a strategy can result in messages being processed in different orders by the primary replica and the backup replicas and, thus, inconsistency within the distributed system.

Many of the basic topics related to fault-tolerant distributed system are discussed in D. Powell, ed., "Delta-4: A Generic Architecture for Dependable Distributed Computing, Springer-Verlag", 1991, which is incorporated herein by reference, including semi-active and passive replication. That book describes a strategy in which the primary replica executes the operations required of the computer system and communicates the results to the backup replicas, so that a backup can perform the same operations as the primary, if the primary fails. However, that strategy does not guarantee that such communication is available to the backup replicas before, or concurrently with, the primary replica's communicating its results to other objects. Thus, it is subject to the risk that the primary might execute method invocations and communicate the results to other objects, and then fail without ensuring that the backups have received the message ordering information that they need to reproduce the actions of the primary. Such a failure can leave a backup with the obligation to reproduce those actions but without the necessary information to do so. Mechanisms that provide such consistent message ordering information are the subject of the current invention.

Multicast protocols that deliver messages reliably and in the same order have been used to maintain the consistency of the states of the replicas of a process in fault-tolerant distributed systems (see, e.g., K. P. Berman and R. van Renesse, "Reliable Distributed Computing with the Isis Toolkit", IEEE Computer Society Press, 1994, which is incorporated herein by reference). Some multicast protocols use a fixed sequencer strategy (see, e.g., U.S. Pat. No. 5,799,146 and M. F. Kaashoek and A. S. Tanenbaum, "Group communication in the Amoeba distributed operating system," Proceedings of the IEEE 11th International Conference on Distributed Computing Systems, Arlington, Tex., May 1991, pp. 220–230, which is incorporated herein by reference) in which a node sends a request to multicast a message to the leader of the group. The leader assigns a sequence number to the message, and multicasts the ordered message to the group. Other multicast protocols use a rotating sequencer strategy (see, e.g., U.S. Pat. No. 4,725, 834 which is incorporated herein by reference) in which a node multicasts a message and a sequencer orders the message after it has been multicast. The responsibility of serving as the sequencer rotates among the various nodes. Other multicast protocols use a token strategy (see, e.g., L. E. Moser, P. M. Melliar-Smith, D. A. Agarwal, R. K. Budhia and C. A. Lingley-Papadopoulos, "Totem: A fault-tolerant multicast group communication system," Communications of the ACM, vol. 39, no. 4, April 1996, pp. 54–63, which is incorporated herein by reference) in which a node must hold the token to multicast a message. The token contains a sequence number that determines the order in which messages are delivered and processed. Such multicast protocols determine the ordering of messages before the messages are delivered and processed.

U.S. Pat. No. 6,035,415, which is incorporated herein by reference, describes a fault-tolerant processing method that is based on a recovery unit consisting of primary and secondary (backup) processing units running replicated application processes. Input messages received at the primary unit are logged to the secondary unit along with any non-deterministic choices made by the primary. The secondary processes the logged input messages in the same order as the primary processes them and makes the same non-deterministic choices as the primary made. The application messages that the secondary replica produces are used as the output messages of the recovery unit. For multiple secondary replicas, the last process in the chain produces the output messages.

U.S. Pat. No. 6,178,441 which is incorporated herein by reference describes a method and system for the reliable and consistent ordering of client requests in a client-server system where the server is replicated. A particular replica of the server is designated to manage client requests, which seek to update a particular network service state. The client requests and the executable order are transferred from the particular server replica to the other server replicas in response to initiating the client request. The particular server replica processes the clients' requests in a tentative mode without waiting for the other server replicas to complete execution of the messages in the executable order. The particular server replica forms a tentative response and stores it in a buffer until it receives, using a two-phase commit protocol, acknowledgments from the other server replicas that they received the executable order. The particular server replica then transfers the tentative response to at least one replica of the client, and the tentative response becomes permanent.

U.S. Pat. No. 6,247,141 which is incorporated herein by reference describes a protocol for providing replicated servers in a client-server system. That patent aims to minimize the end-to-end request/response time seen by the client. The client sends a request to the primary server, and the primary server sends the response to the client, including primary server state information. The primary server also performs backup processing that includes periodically sending primary server state information to its backup server(s). The client receives the response from the primary server, and sends the primary server state information to the backup server.

From the foregoing discussion, it can be seen that there is a need to maintain consistent message ordering for semi-active or passive replication by communicating message-ordering information from the primary replica to the backup replicas without delaying either the request messages or the reply messages, without increasing the number of messages that must be transmitted, and without incurring a risk that a reply message might be delivered to a client, or a request message might be delivered to another server. The present invention satisfies that need, as well as others, and overcomes deficiencies in current approaches.

BRIEF SUMMARY OF THE INVENTION

The present invention addresses the problem of maintaining a consistent message order among the replicas of an object in a fault-tolerant distributed system that uses semi-active or passive replication in order to maintain consistency of the states of the replicas of the object. Because processors within a distributed system operate asynchronously and receive messages asynchronously, and because messages might be lost and retransmitted, messages will not be received and will not be processed in the same order, unless specific mechanisms are implemented to enforce that order.

An aspect of the present invention is to achieve consistent message ordering among the replicas of an object within a fault-tolerant distributed system based on semi-active or passive replication by communicating message ordering information from the primary replica to the backup replicas so as to:

minimize the round-trip request/response time seen by the client (i.e., the end-to-end latency);

minimize the number of extra messages that are communicated; and ensure that, in the event of a fault, a backup replica has, or can obtain, the message ordering information that it needs to reproduce the actions of the primary replica.

In both semi-active and passive replication, a single replica of an object, the primary replica, processes messages from the application. The messages include synchronous requests, synchronous replies, asynchronous requests, asynchronous replies and one-way messages. These messages can be of several different kinds, including TCP messages, SCTP messages, UDP messages, and remote procedure calls. The techniques of wrapping and library interpositioning can be used to divert messages of these various kinds from the standard protocol stacks to the mechanisms of this invention.

For synchronous or asynchronous requests, the primary server replica processes the requests that it receives from the primary client replica in an order determined by sequence number order, reception order, priority, deadline, fairness, availability of resources or other message scheduling criteria, and generates ordering information corresponding to the order in which it processes the messages. The primary server replica communicates that ordering information to the backup server replicas, either directly or indirectly, after it has started processing those requests and either before or concurrently with its transmission of a reply. It piggybacks the ordering information for the request messages onto its replies or requests and multicasts those replies or requests to the appropriate destination object.

For synchronous replies, the primary client replica does not need to provide ordering information for the reply messages, because the backup client replicas simply wait for the reply corresponding to the primary's request, which is ordered automatically.

For asynchronous replies, the primary client replica piggybacks onto its next request message the ordering information for the asynchronous replies that it received since the last request message that it multicast, and then multicasts that request message. The backup client replicas use the message ordering information to order the reply messages.

For one-way messages, the primary client (server) replica multicasts a null message for the one-way messages that it receives from the primary server (client) replica.

In one embodiment of this invention, the primary replica piggybacks message ordering information on its messages and multicasts those messages to the replicas of both the source object and the destination object. In another embodiment of the invention, the primary replica piggybacks message ordering information on its messages and multicasts those messages to the replicas of the destination object, and the primary replica of the destination object piggybacks that message ordering information on its messages and multicasts those messages to the replicas of the source object.

The messages that are communicated between the primary client replica and the primary server replica are on the critical path and determine the end-to-end request/response time seen by the clients; thus, those messages are transmitted immediately and are not delayed. In contrast, the backup replicas receive the messages containing the message ordering information after a short delay and, thus, the backup replicas lag behind the primary replica. Because those messages are not on the critical path, such a delay does not affect the end-to-end request/response time seen by the clients. Moreover, the mechanisms of the invention piggyback the message ordering information on application messages so that additional messages do not need to be transmitted. If a backup replica has not received the message ordering information for a message, then it can obtain that message ordering information from a local peer replica or from a remote replica.

An object of the invention is to maintain consistent message ordering for semi-active or passive replication by communicating message-ordering information from the primary replica to the backup replicas without delaying either the request messages or the reply messages.

Another object of the invention is to maintain consistent message ordering for semi-active or passive replication by communicating message-ordering information from the primary replica to the backup replicas.

Another object of the invention is to maintain consistent message ordering for semi-active or passive replication by communicating message-ordering information from the primary replica to the backup replicas without increasing the number of messages that must be transmitted.

Another object of the invention is to maintain consistent message ordering for semi-active or passive replication by communicating message-ordering information from the primary replica to the backup replicas without incurring a risk that a reply message might be delivered to a client, or a request message might be delivered to another server, and yet the backup replicas do not have, and cannot obtain, the message ordering information that they need to reproduce the actions of the primary replica.

According to an aspect of the invention, the primary server replica delivers and processes (synchronous or asynchronous) request messages or one-way messages before it multicasts the ordering information for those messages, and the primary client delivers asynchronous reply messages and one-way messages before it multicasts the ordering information for those messages. The primary client replica does not need to announce the ordering of synchronous reply messages because such messages are ordered automatically, and are delivered and processed when they are received.

According to another aspect of the invention, the primary server replica produces the reply messages and sends them directly to the clients, resulting in lower end-to-end request/response times seen by the clients, and the backup server replicas receive the request messages directly from the clients, as multicast messages, rather than from their own primary.

According to a further aspect of the invention, the primary server replica is not required to wait to transfer the response to the client, which increases the end-to-end request/response time seen by the client.

According to a still further aspect of the invention, network bandwidth is conserved by multicasting messages, so that when request messages, reply messages or ordering information must be transmitted to multiple replicas, said transmission is achieved by a single transmission rather than multiple transmissions. Moreover, the current invention applies to not only simple two-tier client-server applications but also multi-tier and peer-to-peer applications.

Further aspects of the invention will be brought out in the following portions of this document, wherein the detailed description is for the purpose of fully disclosing preferred embodiments of the invention without placing limitations thereon.

BRIEF DESCRIPTION OF THE SEVERAL VIEWS OF THE DRAWINGS

The above and further advantages of the invention can be better understood by referring to the following description in conjunction with the accompanying drawings, in which.

DETAILED DESCRIPTION OF THE INVENTION

Figure 1:
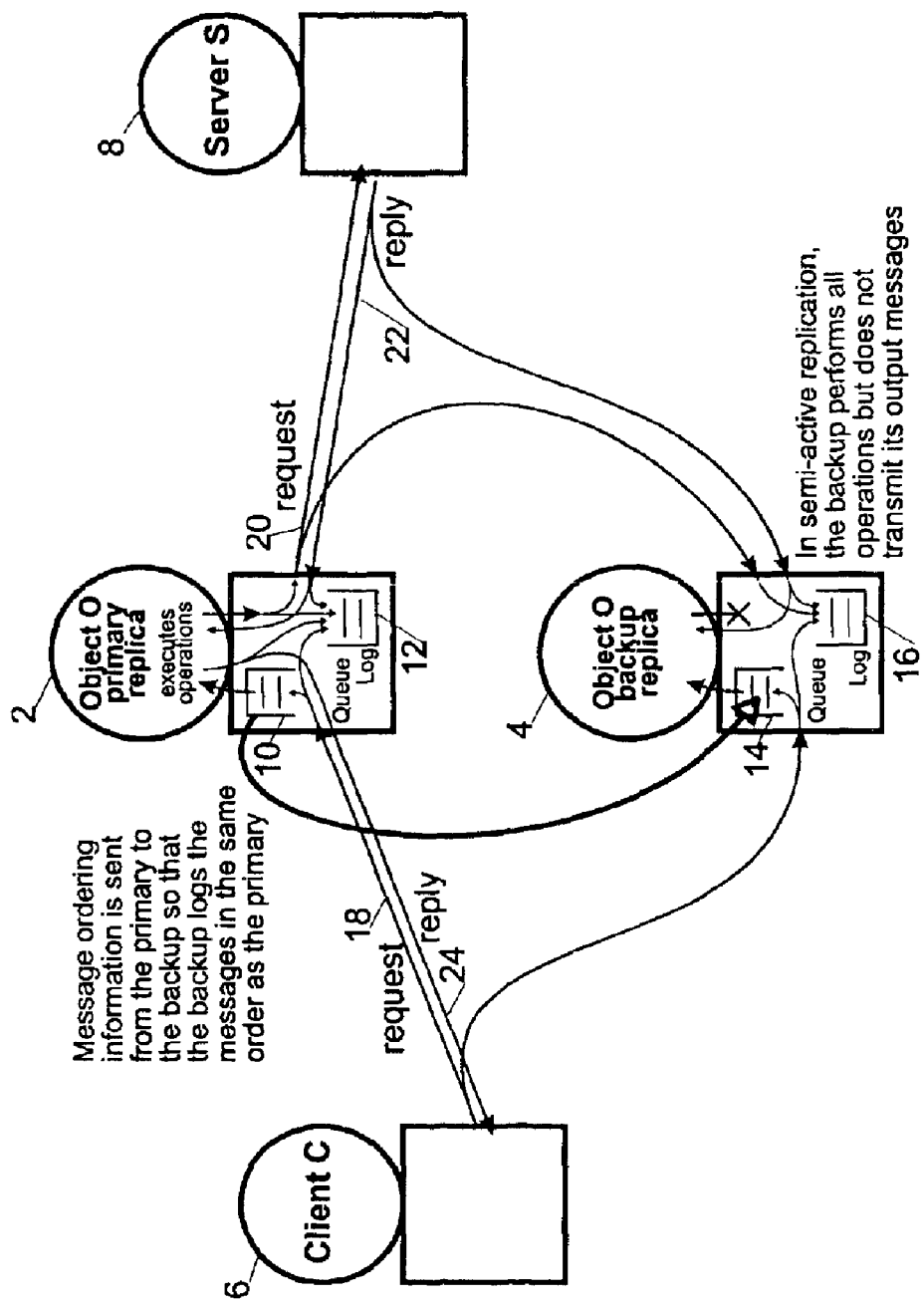
FIG. 1 is a diagram that illustrates the mechanisms of the invention used for semi-active replication.

The context in which this invention is described is an application program that is replicated for fault tolerance, where the replicas are distributed across multiple computers within a network of computers. The application objects are replicated using semi-active or passive replication, where there is a single primary replica of an object and one or more backup replicas of an object. In this invention the term object is used to refer not only to objects but also to processes, containers, components, memory protection domains or processors.

The invention is described in terms of a client object that invokes methods of a server object. An object can act as both a client and a server in a multi-tier or peer-to-peer application, where a server also acts as a client and invokes methods of other servers. The terms first object and second object are also used to refer to the client object and the server object. The invention supports replication of both client objects and server objects. Although some of the diagrams below show only a single client object, typically there will be more than one client object.

The mechanisms of the current invention are unaffected by any of the above extensions.

For applications in which both clients and servers are replicated using semi-active or passive replication, the primary client multicasts a request message containing a method invocation to the replicas of the server on a connection.

When the primary server receives a (synchronous or asynchronous) request message on a connection, it processes that message in an order determined by sequence number order, reception order, priority, deadline, fairness, availability of resources or other message scheduling criteria and executes the method contained in that request message. The primary server piggybacks, in its reply message to the client, or in a nested request message to another server, ordering information that specifies the order in which it processed the request message. The ordering information determines the order in which the backup servers process the request message, so that they can reproduce the actions of the primary server and, thus, maintain strong replica consistency. The primary server then multicasts the reply message, containing the result of the operation and the piggybacked message ordering information, to the replicas of the client or it multicasts the nested request message, containing a method invocation of that other server and the piggybacked message ordering information, to the replicas of that other server.

Similarly, when a primary client replica receives an asynchronous reply message, it delivers that message in an order determined by sequence number order, reception order, priority, deadline, fairness, availability of resources or other message scheduling criteria. The primary client piggybacks, in its next request message, the message ordering information that specifies the order in which it processed the reply message. The ordering information determines the order in which its backup client replicas process the reply message, so that they can reproduce the actions of the primary client and, thus, maintain strong replica consistency. The primary client then multicasts the next request message, containing the method invocation of the server and the piggybacked message ordering information, to the replicas of the server.

When a client replica receives a synchronous reply message, the client replica can deliver the reply message to the replicas for processing immediately upon receipt. For synchronous reply messages, the primary client replica does not need to provide message ordering information to the backup client replicas, because the client replicas are blocked waiting for the reply to the corresponding request.

When a primary server replica or a primary client replica receives a one-way message, it piggybacks the message ordering information for the one-way message on the next message it multicasts.

In one embodiment of this invention, the primary client (server) multicasts messages to the replicas of both the client and the server and the primary must receive an acknowledgment for the message from the replicas of both the client and the server.

In another embodiment, the server (client) multicasts the messages to only the replicas of the client (server) on a connection. The primary client (server) then piggybacks, on each message that it originates and multicasts, the message ordering information that it received on that same connection since the last message that it multicast. Thus, the primary client (server) reflects the message ordering information back to the replicas of the server (client) so that the backup replicas receive the message ordering information that their own primary replica generated. In this embodiment, the primary server (client) piggybacks the message ordering information on each message that it multicasts until it receives a message containing that message ordering information reflected back to it.

When the backup replicas receive a message, they extract, from the message, the message ordering information for the (synchronous and asynchronous) requests, asynchronous replies and one-way messages, and process those messages in the order specified in the message ordering information.

For semi-active and passive replication, the backup replicas do not multicast request messages or reply messages, which reduces network traffic and avoids the need for duplicate detection and suppression.

A primary server interleaves for processing (synchronous or asynchronous) request and one-way messages from different connections and, consequently, determines a message order in which the request and one-way messages from different connections are interleaved. Similarly, a primary client interleaves for processing asynchronous reply and one-way messages from different connections and, consequently, determines a message order in which the asynchronous reply and one-way messages on different connections are interleaved.

For a middle-tier or peer-to-peer object, a primary replica acts as both the primary server replica and the primary client replica. As a server, the primary orders the (synchronous and asynchronous) request and one-way messages that it receives, and generates and multicasts message ordering information for those messages. As a client, the primary orders the asynchronous reply and one-way messages that it receives, and generates and multicasts ordering information for those messages. For a middle-tier or a peer-to-peer object, the primary piggybacks the message ordering information for a request either on the reply message for that request or on a nested request message.

In all of these embodiments, the techniques of wrapping and library interpositioning can be used to divert messages of several kinds, including TCP messages, SCTP messages, UDP messages, and remote procedure calls, from the standard protocol stacks to the mechanisms disclosed herein, thus allowing application programs to be rendered fault-tolerant without modification of those programs.

The diagrams and the descriptions shown below will further illustrate the preferred embodiments of this invention.

Semi-Active Replication

FIG. 1 illustrates semi-active replication in which the primary replica executes method invocations, logs requests and replies, and multicasts requests and replies. The backup replicas execute method invocations, and log requests and replies, but do not multicast requests and replies.

FIG. 1 shows a replicated object O with a primary replica 2 and a backup replica 4, a client C 6 and a server S 8. The primary replica of object O maintains a message queue 10 containing requests that it has received for processing and a message log 12 containing both requests and replies that it has generated and received. Similarly, the backup replica of object O maintains a message queue 14 and a message log 16.

The client C issues a request 18 containing a method invocation of object O. Both the primary replica and the backup replica insert that request into their message queues and message logs and process C's request, which in turn invokes a method of server S. Only the primary replica transmits that request 20 to server S, but both the primary replica and the backup replica insert that request into their message queues and message logs. The server S processes O's request, and transmits the reply 22 to both the primary replica and the backup replica, which insert the reply into their message logs. The primary replica and the backup replica complete processing client C's request, generate the reply and insert the reply into their message logs. Only the primary replica transmits the reply 24 to client C.

Passive Replication

Figure 2:
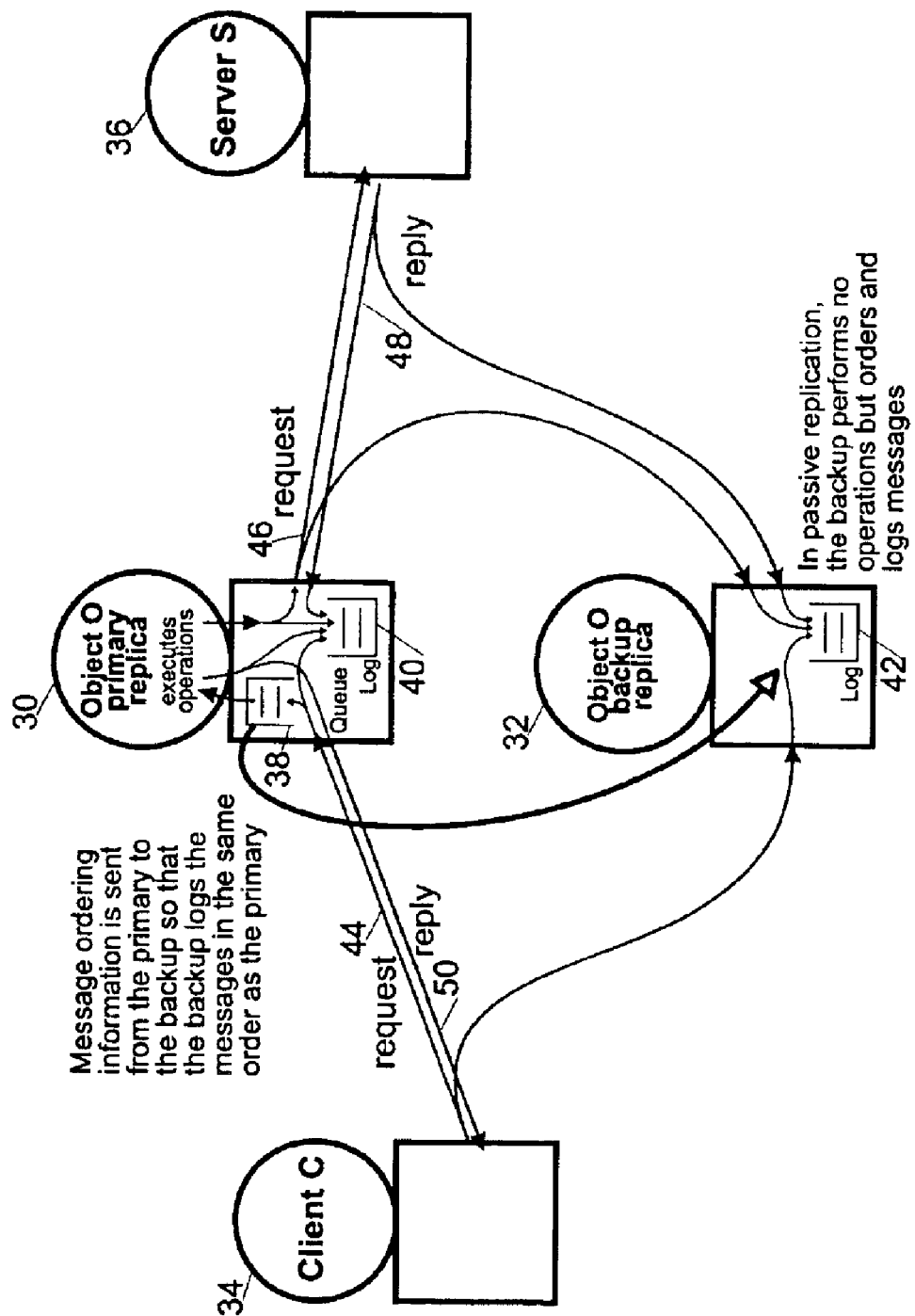
FIG. 2 is a diagram that illustrates the mechanisms of the invention used for passive replication.

FIG. 2 illustrates passive replication in which the primary replica receives method invocations, executes the method invocations, logs requests and replies, and multicasts requests and replies. The backup replicas receive method invocations and log requests and replies, but do not execute method invocations and do not multicast requests and replies.

FIG. 2 shows a replicated object O with a primary replica 30 and a backup replica 32, a client C 34 and a server S 36. The primary replica of object O maintains a message queue 38 containing requests that it has received for processing and a message log 40 containing both requests and replies that it has generated and received. The backup replica of object O maintains only a message log 42.

The client C issues a request 44 containing a method invocation of object O. The primary replica inserts the request into its message queue and message log, and the backup replica inserts the request into its message log. The primary replica processes C's request, which in turn invokes a method of server S. The primary replica transmits that request 46 to server S and to the backup replica, and inserts that request into its message queue and message log. The backup replica inserts that request into its message log. The server S processes O's request, and transmits the reply 48 to both the primary replica and the backup replica. The primary replica inserts that reply into its message queue and message log, and the backup replica Inserts that reply into its message log. Finally, the primary replica completes processing client C's request and transmits the reply 50 to client C.

Communication of Message Ordering Information

Figure 3:
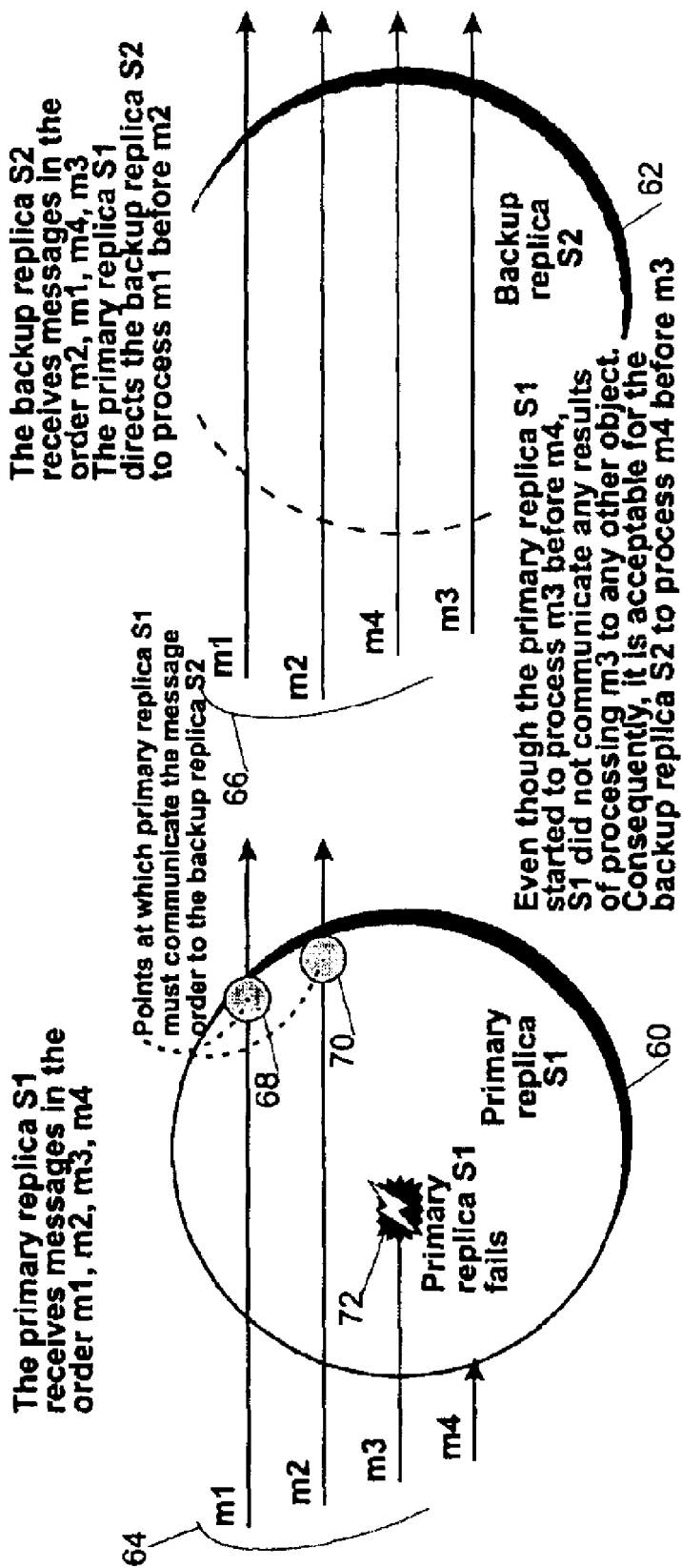
FIG. 3 is a diagram of a primary server replica and a backup server replica, indicating the points at which the primary replica must communicate message ordering information to the backup replica and when it is acceptable for the backup replica, which has become the new primary replica, to process messages in a different order from the order in which the primary replica processed them before it failed.

FIG. 3 is a diagram of a primary server replica and a backup server replica, indicating the points at which the primary must communicate message ordering information to the backup and, if the primary fails, when it is acceptable for the backup, which has become the new primary, to process messages differently from the primary before it failed. FIG. 3 shows a primary replica S1 60 and a backup replica S2 62. The primary replica receives messages in the order m1, m2, m3 and m4 64. The backup replica S2 receives messages in the order m2, m1, m4 and m3 66. FIG. 3 also shows the points at which S1 must communicate message ordering information for m1 and m2 to S2 68 and 70. Before it has completed processing message m3, the primary replica S1 fails 72. Even though S1 started to process m3 before m4, S1 did not communicate any results of processing m3 to any other object. Consequently, the backup replica S2 can process m3 and m4 in any order; in particular, it can process m4 before m3.

Figure 4:
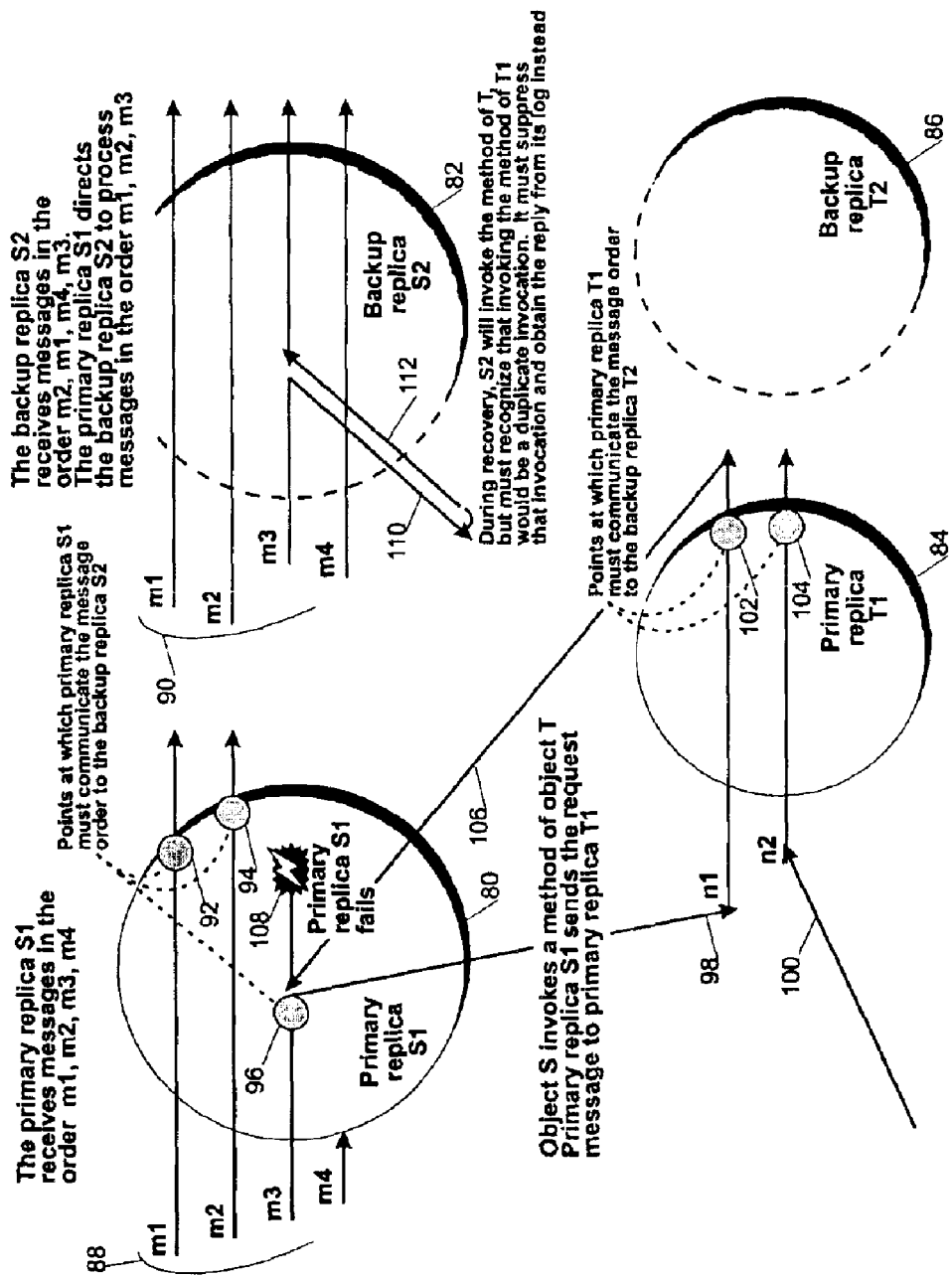
FIG. 4 is a diagram of a primary server replica and a backup server replica, where the primary replica invokes a method of another server, indicating the points at which the primary replica must communicate message ordering information to the backup replica.

FIG. 4 is a diagram of a primary server replica and a backup server replica, where the primary replica invokes a method of another server, indicating the points at which the primary replica must communicate message ordering information to the backup replica. FIG. 4 shows a primary replica S1 80, a backup replica S2 82, a primary replica T1 84 and a backup replica T2 86. The primary replica S1 receives messages in the order m1, m2, m3 and m4 88. The backup replica S2 receives messages in the order m2, m1, m4 and m3 90. FIG. 4 also shows the points at which S1 must communicate message ordering information for m1 and m2 to S2 92 and 94. As a part of its processing of message m3 96, S1 sends a request message n1 98 to the primary replica T1 containing a method invocation of server T. Another object sends a request message n2 100 to the primary replica T1. FIG. 4 further shows the points at which T1 must communicate message ordering information to the backup replica T2 102 and 104. After it has received the reply 106, but before it has completed processing message m3, the primary replica S1 fails 108. During recovery, S2 must recognize that invoking the method of T would be a duplicate invocation and, thus, it must suppress that invocation and obtain the reply from its log.

Embodiments of the Invention

Figure 5:
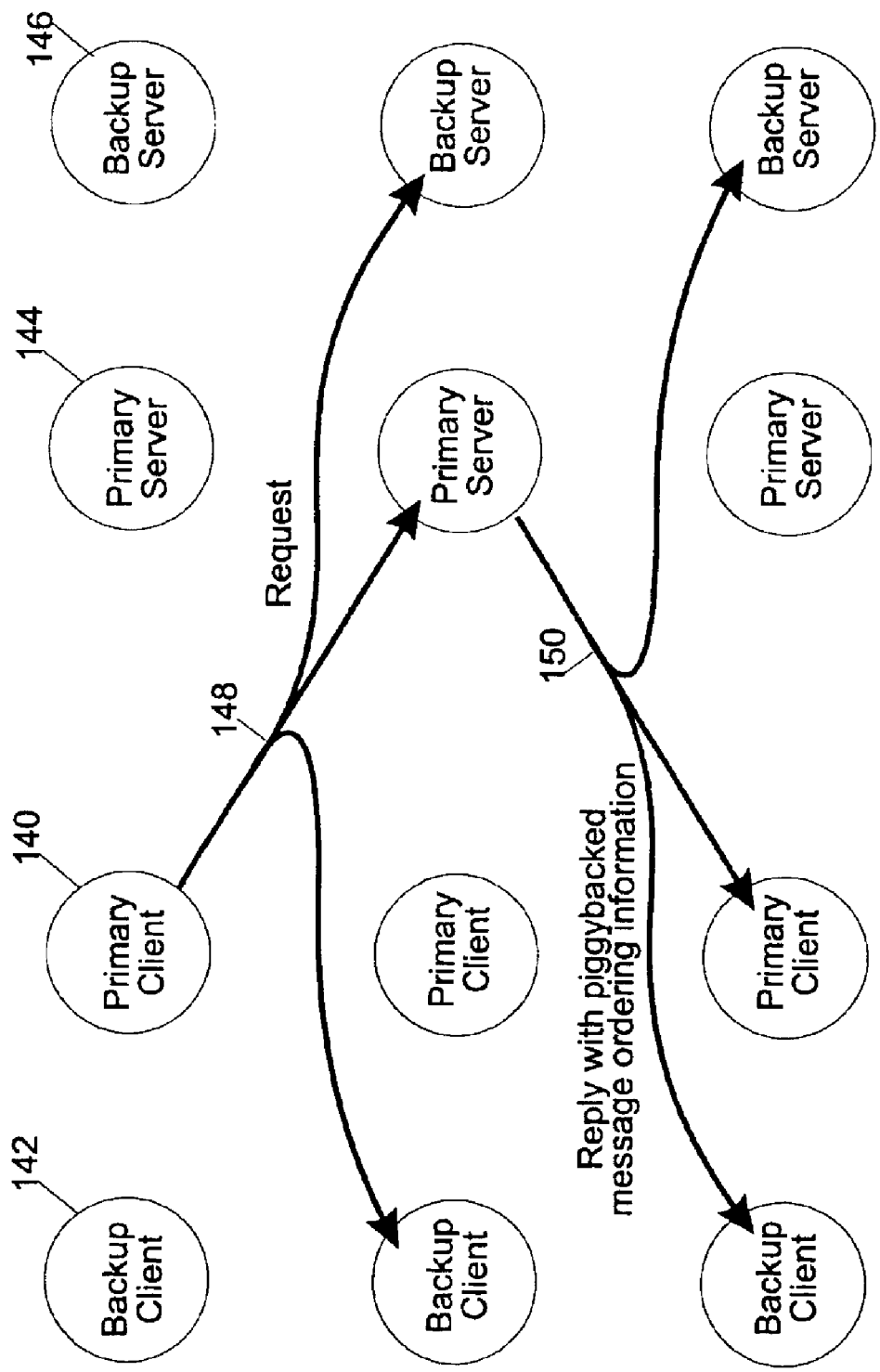
FIG. 5 is a diagram that illustrates one embodiment of the invention, where messages are multicast to the replicas of both the source object and the destination object.

With the foregoing in mind, refer to FIG. 5 which is a diagram that illustrates an embodiment of the invention in which messages are multicast to the replicas of both the client object and the server object. FIG. 5 shows a replicated client with a primary client 140 and a backup client 142 and a replicated server with a primary server 144 and a backup server 146. The primary client's request message 148 is multicast to the primary and backup servers, as well as to the backup client. The primary server's reply message 150, containing piggybacked message ordering information, is multicast to the primary and backup clients, as well as to the backup server.

Figure 6:
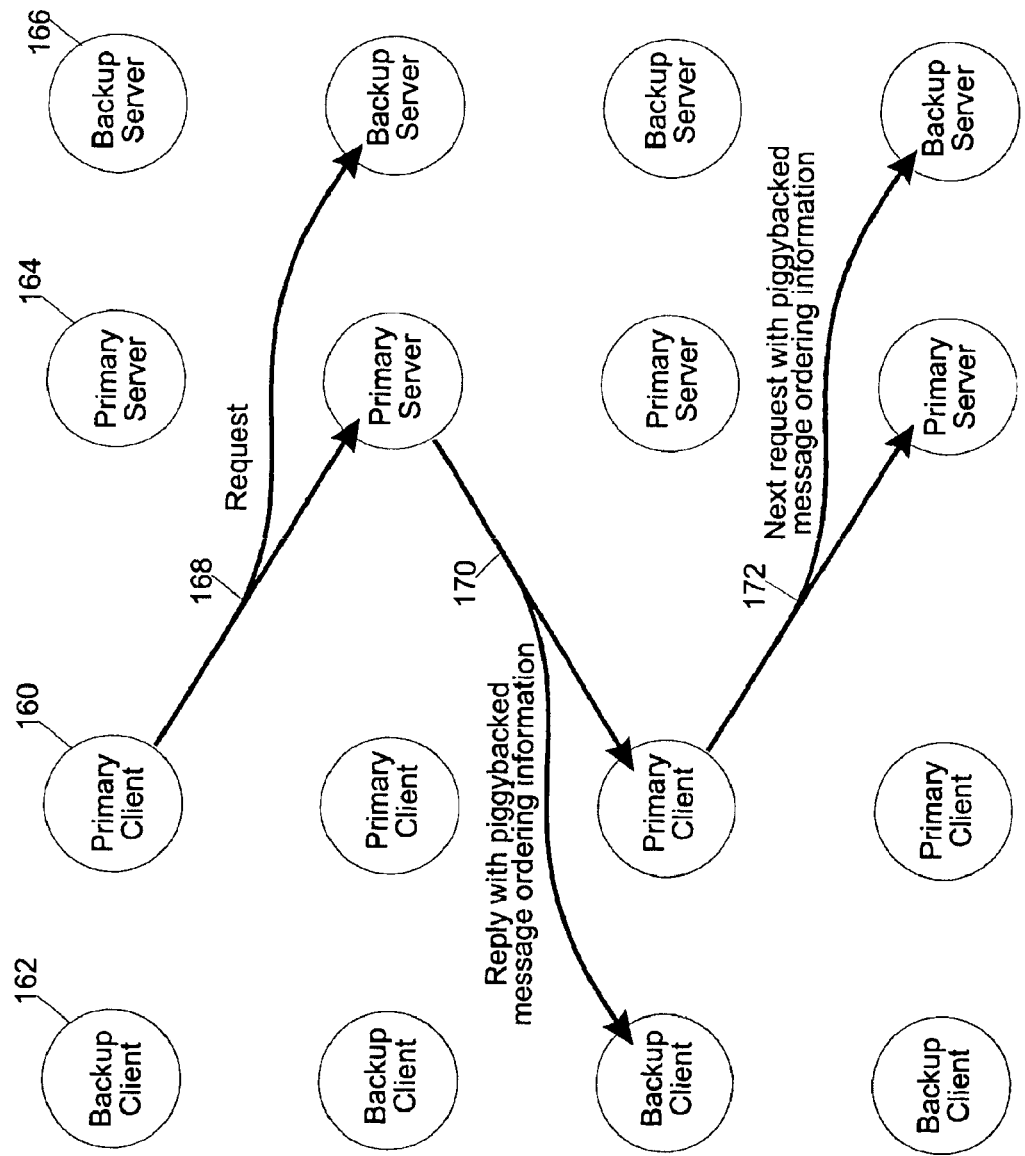
FIG. 6 is a diagram that illustrates another embodiment of the invention, where messages are multicast to the replicas of only the destination object.

FIG. 6 is a diagram that illustrates an embodiment of the invention in which messages are multicast to the replicas of only the destination object. FIG. 6 shows a replicated client with a primary client 160 and a backup client 162 and a replicated server with a primary server 164 and a backup server 166. The primary client's request message 168 is multicast to the primary and backup servers. The primary server's reply message 170, containing piggybacked message ordering information for the request, is multicast to the primary and backup clients. The primary client's next request 172, containing piggybacked ordering information from the primary server for its previous request, is multicast to the primary and backup servers.

Flow Diagrams

The invention can be further understood by referring to the flow diagrams of FIG. 7 through FIG. 11, wherein C represents a particular connection on which the primary replica of a first object orders and multicasts messages and on which the replicas of a second object receive messages that they are to process. In a direct multicast connection, the backup replicas of the first object receive messages from their own local primary containing the announcements of message ordering information, which allow the backup replica to process the messages in the same order that the primary processed the messages.

The message sequence number, seqNum, of the message is used for reliable delivery of messages on the connection C. If a replica of the destination object detects a gap in the sequence numbers of messages that it received on the connection C, then it knows that it has missed a message and multicasts a negative acknowledgment for that message. Such mechanisms for achieving reliable delivery are well known in the art.

The message order number, orderNum, corresponds to the order in which the primary replica processes the messages that it receives on its various connections.

The message ordering information, orderInfo, is a structure containing the orderNum, the seqNum and C, that the primary replica piggybacks on the messages that it multicasts.

The pending source order list, pendingSourceOrder, contains the primary replica's pending announcements of message ordering information. The constant pendingSourceOrderMax determines the number of pending announcements that the primary replica collects before it sends a null message containing those announcements.

For the embodiment of the invention in which only the destination object can receive messages on a connection, the pending remote order list, pendingRemoteOrder, contains announcements of message ordering information that the local primary replica received from the remote primary replica on the connection for which it has not yet received acknowledgments. The message order list, messageOrder, contains the messages that have been ordered and that are ready to be processed.

Primary Replica Orders a Message on a Connection

Figure 7:
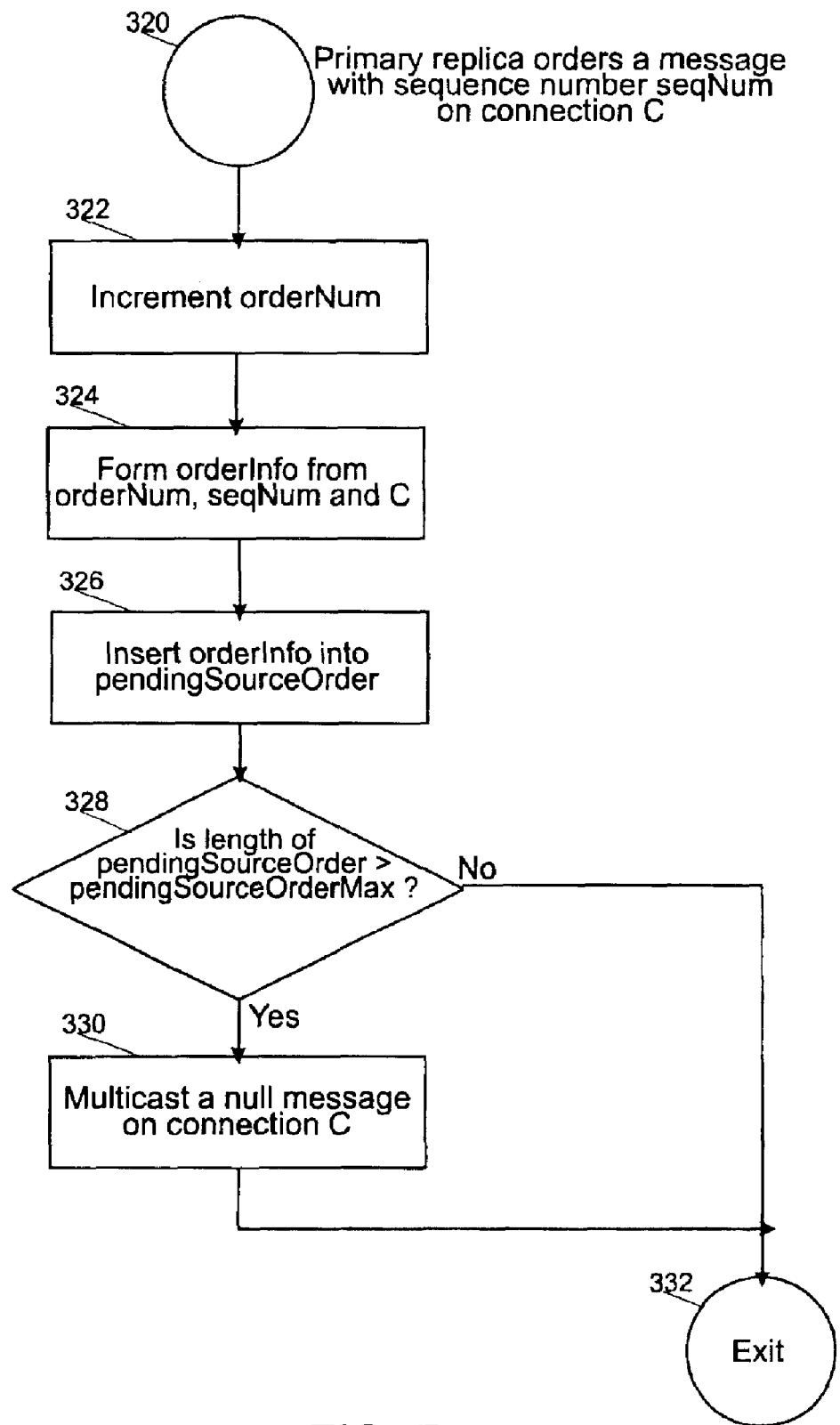
FIG. 7 is a flow diagram that shows the steps taken by a primary replica in ordering a message on a connection.

FIG. 7 is a flow diagram in which a primary replica orders a message with sequence number, seqNum, on a connection C 320. First, the primary replica increments the orderNum 322 and then it forms the orderInfo structure containing orderNum, seqNum and C 324. Next, it inserts orderInfo into the pendingSourceOrder list of pending announcements 326 and checks whether the number of items in that list is greater than pendingSourceOrderMax 328. If the number of items is greater than pendingSourceOrderMax, then it multicasts a null message on the connection C containing the announcements in that list 330 and exits 332. Otherwise, it simply exits 332. Pseudo-code is given below.

Figure 8:
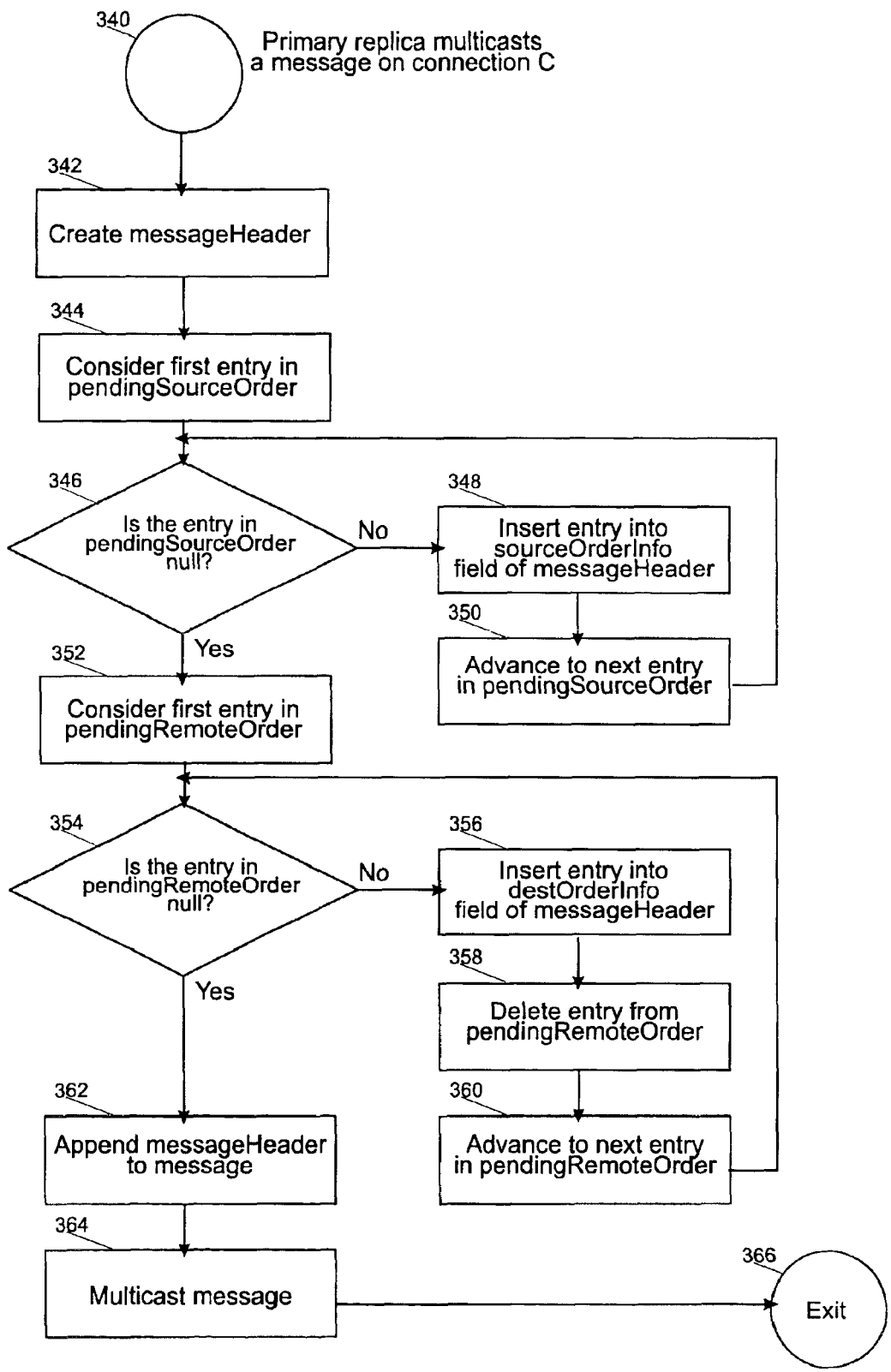
FIG. 8 is a flow diagram that shows the steps taken by a primary replica in multicasting a message on a connection.

Increment orderNum
Form orderInfo from orderNum, seqNum and C
Append orderInfo to pendingSourceOrder list
If length of pendingSourceOrder list > pendingSourceOrderMax
    multicast a null message on connection C Primary Replica Multicasts a Message on a Connection FIG. 8 is a flow diagram in which a primary replica multicasts a message on a connection C for the embodiment of the invention in which only the destination object can receive messages on a connection 340. First, the primary replica creates the message header 342. Next, it considers the first entry in the pendingSourceOrder list 344 and checks whether that entry is null 346. If that entry in the pendingSourceOrder list is not null, the primary replica inserts that entry into the sourceOrderInfo field of the messageHeader 348 and then advances to the next entry in the pendingSourceOrder list 350. It then repeats the sequence of steps 346–350. If that entry in the pendingSourceOrder list is null, the primary replica considers the first entry in the pendingRemoteOrder list 352 and checks whether that entry is null 354. If that entry in the pendingRemoteOrder list is not null, it inserts that entry into the destOrderInfo field of the messageHeader 356, deletes the entry from the pendingRemoteOrder list 358 and advances to the next entry in the pendingRemoteOrder list 360. It then repeats the sequence of steps 354–360. If that entry in the pendingRemoteOrder list is null, the primary replica appends the messageHeader to the message 362, multicasts the message 364 and then exits 366. Pseudo-code is given below.

Figure 9:
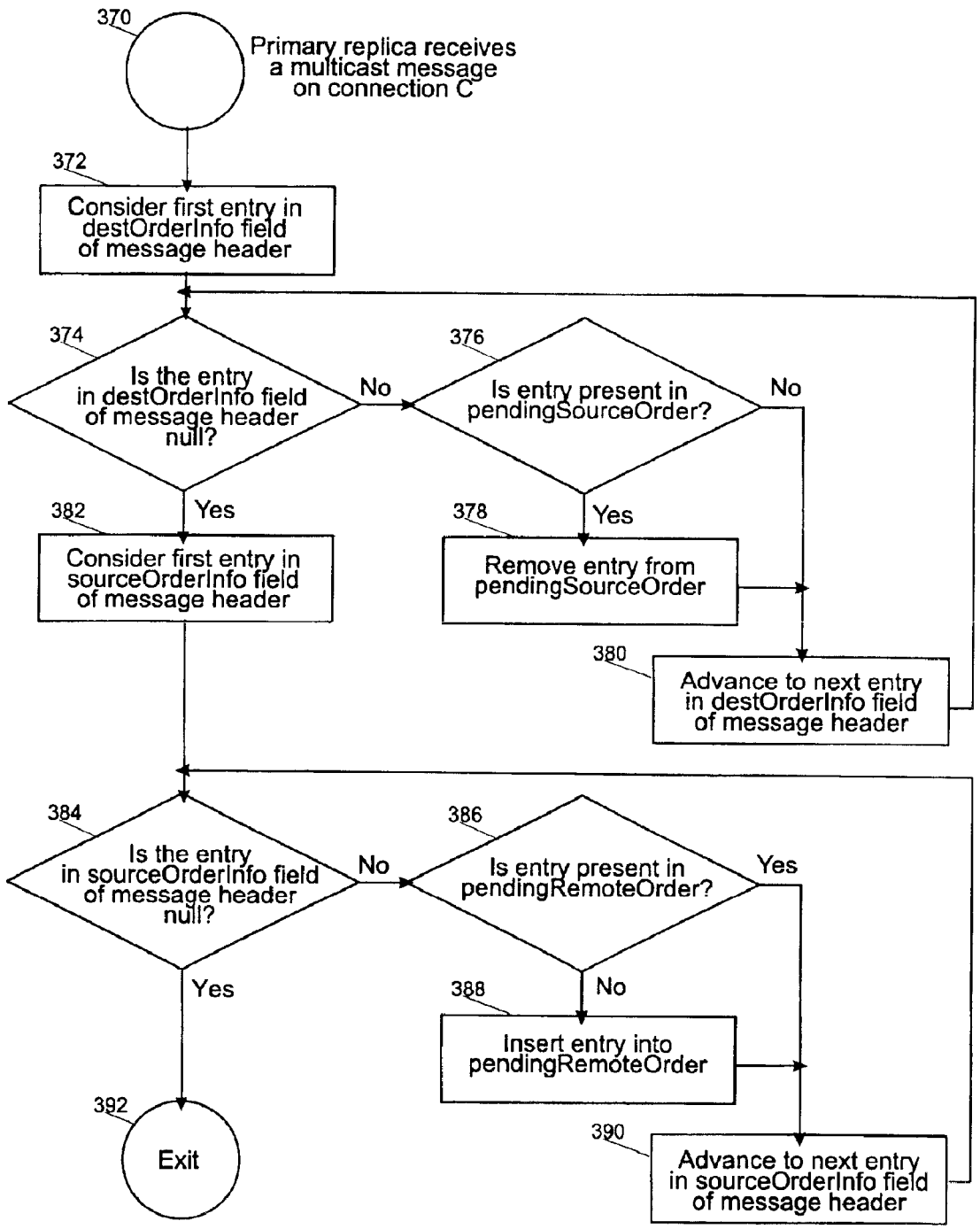
FIG. 9 is a flow diagram that shows the steps taken by a primary replica in receiving a message on a connection.

Create messageHeader
For each entry in pendingSourceOrder
    insert entry into sourceOrderInfo field of messageHeader
For each entry in pendingRemoteOrder for connection C
    insert entry into destOrderInfo field of messageHeader
Append messageHeader to message
Multicast message Primary Replica Receives a Multicast Message on a Connection FIG. 9 is a flow diagram in which a primary replica receives a multicast message on a connection C for the embodiment in which only the destination object can receive messages on a connection 370. The primary replica considers the first entry in the destOrderInfo field of the message header 372 and checks whether that entry is null 374. If that entry is not null, the primary replica checks whether that entry is present in the pendingSourceOrder list 376. If that entry is present in the pendingSourceOrder list, it removes that entry from the pendingSourceOrder list 378 (because that entry in the destOrderInfo field constitutes an acknowledgment for the message that it sent) and advances to the next entry in the destOrderInfo field of the message header 380. It then repeats the sequence of steps 374–380. If the entry is not present in the pendingSourceOrder list, it advances to the next entry in the destOrderInfo field of the message header 380. It then repeats the sequence of steps 374–380. If that entry in the destOrderInfo field of the message header is null, the primary replica considers the first entry in the sourceOrderInfo field of the message header 382 and checks whether that entry is null 384. If that entry in the sourceOrderInfo field is not null, the primary replica checks whether that entry is present in the pendingRemoteOrder list 386. If that entry present the pendingRemoteOrder list, it advances to the next entry in the sourceOrderInfo field of the message header 390. It then repeats the sequence of steps 384–390. If that entry is not present in the pendingRemoteOrder list, it inserts the entry into the pendingRemoteOrder list 388 and advances to the next entry in the sourceOrderInfo field of the message header 390. It then repeats the sequence of steps 384–390. If that entry in the sourceOrderInfo field of the message header is null, it exits 392. Pseudo-code is given below.

For each entry in destOrderInfo field of messageHeader
    remove entry from pendingSourceOrder
For each entry in sourceOrderInfo field of messageHeader if that entry is not present in pendingRemoteOrder for connection C
   insert entry into pendingRemoteOrder for connection C

Backup Replica Receives a Multicast Message on a Connection

Figure 10:
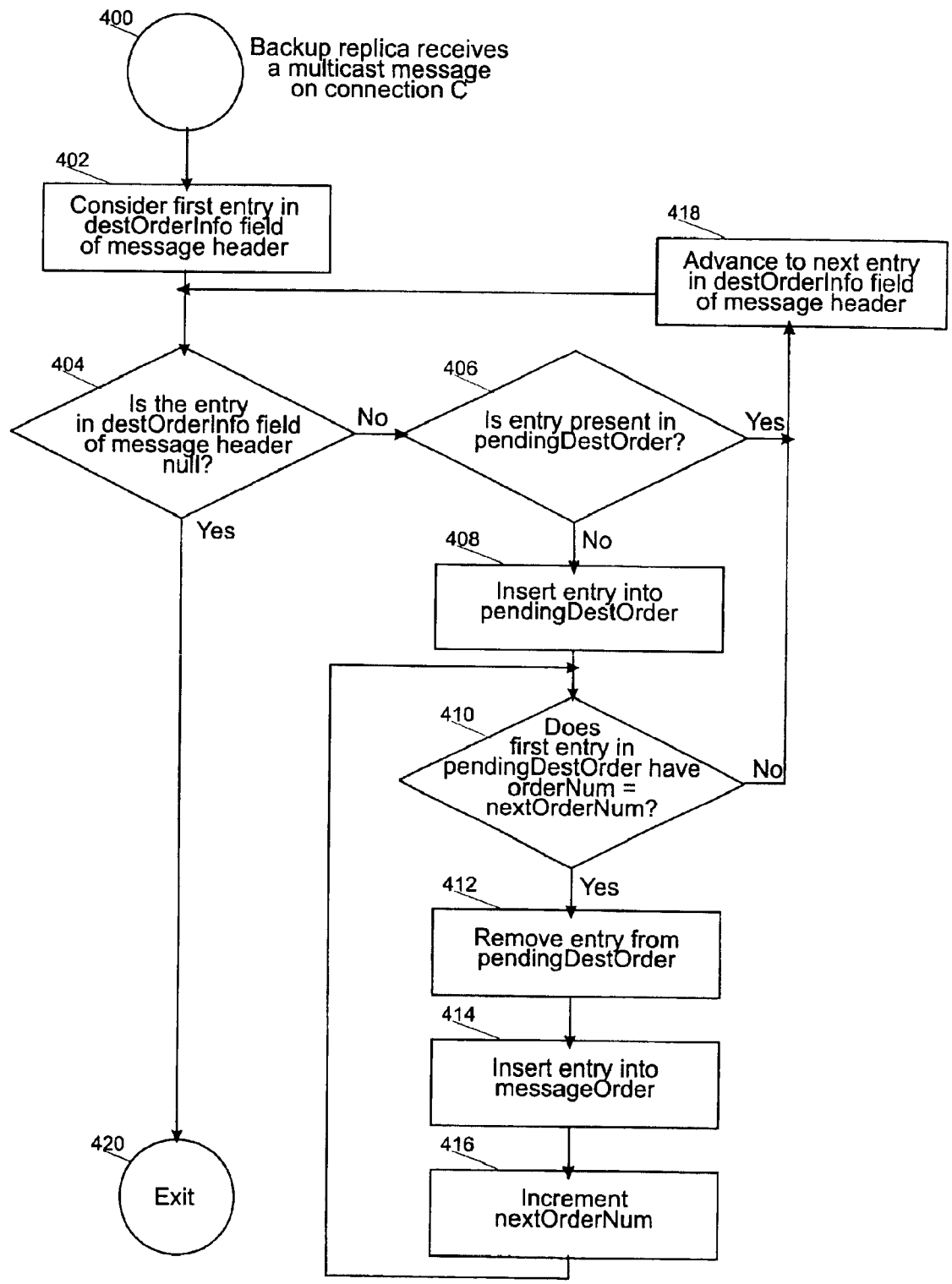
FIG. 10 is a flow diagram that shows the steps taken by a backup replica in receiving a message on a connection.

FIG. 10 is a flow diagram in which a backup replica receives a multicast message on a connection C for the embodiment in which only the destination object can receive messages on a connection 400. The backup replica considers the first entry in the destOrderInfo field of the message header 402 and checks whether that entry is null 404. If that entry in the destOrderInfo field of the message header is not null, the backup replica checks whether that entry is present in the pendingDestOrder list 406. If that entry is present in the pendingDestOrder list, it advances to the next entry in the destOrderInfo field of the message header 418. It then repeats the sequence of steps 404–418. If that entry in the destOrderInfo field is not present in the pendingDestOrder list, it inserts that entry into the pendingDestOrder list 408. It then checks whether orderNum for the first entry in the pendingDestOrder list is equal to nextOrderNum 410. If orderNum equals nextOrderNum (which indicates that there are no gaps in the pendingDestOrder list up to this point), the backup replica removes that entry from the pendingDestOrder list 412, inserts that entry into its messageOrder list for processing 414 and increments nextOrderNum 416. It then repeats the sequence of steps 410–416. If orderNum does not equal nextOrderNum, the backup replica advances to the next entry in the destOrderInfo field of the message header 418. It then repeats the sequence of steps 404–418. If that entry in the destOrderInfo field of the message header is null, it exits 420. Pseudo-code is given below.

```
For each entry in destOrderInfo field of messageHeader
   if entry is not present in pendingDestOrder
      insert entry into pendingDestOrder
   nextOrderNum=1
   while anEntry is present in pendingDestOrder
      with orderNum=nextOrderNum
      remove anEntry from pendingDestOrder
      insert anEntry into messageOrder
      increment nextOrderNum
```

Processing and Communicating Message Ordering Information

Figure 11:
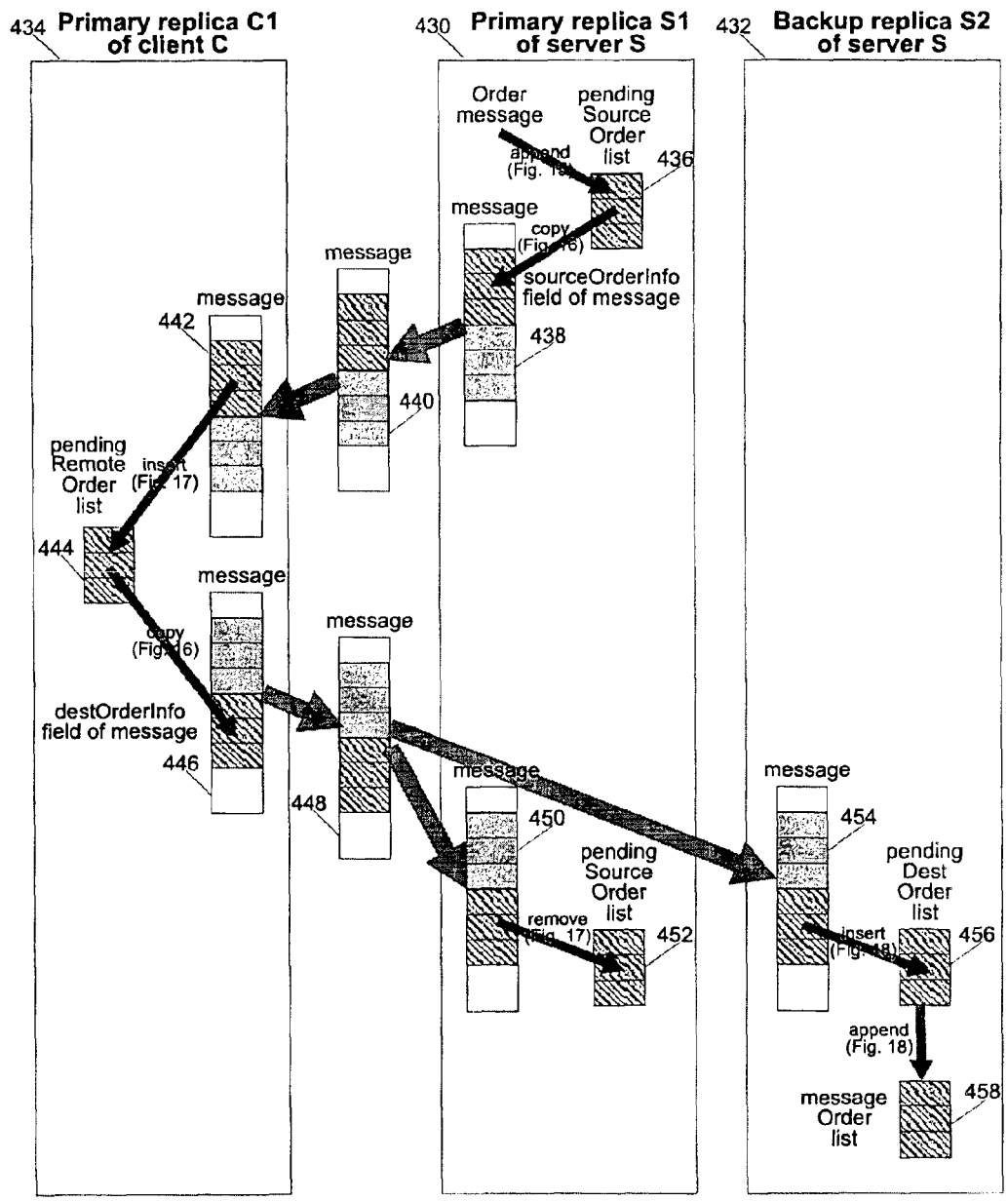
FIG. 11 is a diagram that shows the processing and communication of message ordering information from the primary replica of a first object to the replicas of a second object to a backup replica of the first object.

FIG. 11 illustrates an embodiment of the invention in which message ordering information is communicated from the primary replica of a server object to the primary replica of a client object to a backup replica of the server object. FIG. 11 shows a primary replica S1 430 and a backup replica S2 432 of server S and a primary replica C1 434 of client C. The primary server replica S1 orders a message and appends the message ordering information to its pendingSourceOrder list 436 (FIG. 7). In the next message that it multicasts, the primary server replica S1 copies (FIG. 8) entries in the pendingSourceOrder list into the sourceOrderInfo field of the message 438 and then multicasts the message 440 to the replicas of the client C. On receipt of the message 442, the primary client replica C1 processes the entries in the sourceOrderInfo field of the message and inserts (FIG. 9) the entries into the pendingRemoteOrder list 444. In the next message that it multicasts, the primary client replica C1 copies (FIG. 8) the entries of the pendingRemoteOrder list into the destOrderInfo field of the message 446 and then multicasts the message 448 to the replicas of the server S. When the primary server replica S1 receives the message 450, it processes the entries in the destOrderInfo field of the message and removes (FIG. 9) the entries from the pendingSourceOrder list 452. When the backup server replica S2 receives the message 454, it processes the entries in the destOrderInfo field of the message and inserts (FIG. 10) the entries into the pendingDestOrder list 456. If there are no missing messages preceding a message in the pendingDestOrder list, the backup server replica S2 removes that message from the pendingDestOrder list and appends (FIG. 10) the message to the messageOrder list 458. Subsequently, if the primary server replica S1 fails, the backup server replica S2 becomes the new primary server and processes the messages in the messageOrder list in the order of orderNum.

Accordingly, it can be seen that the mechanisms of this invention achieve consistent message ordering within a fault-tolerant distributed system based on semi-active or passive replication. The mechanisms communicate message ordering information from the primary replica to its backup replicas in such a way as to minimize the end-to-end request/response time, to minimize the number of additional messages that are multicast, and to ensure that, in the event of a fault, a backup replica has, or can obtain, the messages and the message ordering information that it needs to reproduce the actions of the primary replica. The primary replica processes the request messages in an order determined by sequence number order, reception order, priority, deadline, fairness, resource availability or other message scheduling criteria. It piggybacks the message ordering information on the messages that it originates and multicasts the messages to only the client, or to the client and its own backup replicas. If the primary replica multicasts messages to only the client the client reflects the message ordering information to the backup replicas by piggybacking that information on the messages that it multicasts. Thus, the backup replicas receive the message ordering information from the primary replica and process the messages in the same order as the primary replica processes them. The techniques of wrapping and library interpositioning can be used to divert messages of standard protocol stacks to the mechanisms of this invention.

As will be appreciated, therefore, the invention is directed to a method or computer program that executes on two or more computers that operate over a communication network, in a fault tolerant computer system that uses semi-active or passive replication of application program objects wherein message ordering information is communicated from the primary replica to the backup replicas for achieving consistent message ordering among the primary and backup replicas. The primary replica processes messages, selected from the set of messages consisting essentially of synchronous requests, synchronous replies, asynchronous requests, asynchronous replies and one-way messages. Moreover, the messages can be selected from the set of messages consisting essentially of TCP messages, SCTP messages, UDP messages, and remote procedure calls.

According to an aspect of the invention, a primary server replica processes requests received from a primary client replica in an order determined by a criterion selected from the set of criteria consisting essentially of sequence number order, reception order, priority, deadline, fairness, and availability of resources, wherein the primary server replica generates ordering information corresponding to the order in which it processes messages. Furthermore, the primary server replica communicates ordering information to the backup replicas, either directly or indirectly, after it has started processing those requests and either before or concurrently with its transmission of a reply.

Another aspect of the invention is that the primary replica piggybacks message ordering information on its messages and multicasts those Alternatively, the primary replica piggybacks message ordering information on its messages and multicasts those messages to destination object replicas, and the primary replica of the destination object piggybacks that message ordering information on its messages and multicasts those messages to source object replicas.

Another aspect of the invention exploits multicast communication to achieve fault tolerance using semi-active or passive replication of objects with a primary replica and one or more backup replicas, and to maintain a consistent message delivery order across the replicas of an object to achieve strong replica consistency, despite asynchronous message reception, message loss and failure of the replicas, without requiring additional messages in fault-free conditions beyond those required in a system without replication. Wrapping and library interpositioning are used to divert messages from standard protocol stacks to said procedures of this invention, so that application programs can be rendered fault-tolerant without modification to said application programs. Furthermore, the primary replica of an object can receive and process a first message, and can multicast further messages as a result of processing said first message, prior to announcing an order for said first message so that, in fault-free conditions, the end-to-end request/response time is not degraded by the need to transmit additional messages, or to wait for reception of additional messages, over and above the messages required in a system without replication. Additionally, for each pair of replicated objects between which messages are to be communicated, a multicast connection is established and every message multicast on said connection by a replica of a first object of said pair of objects is delivered to each replica of both objects, or to each replica of the second object of said pair of objects. The replicas of each object that participates in the multicast connection require no knowledge of the number of replicas, or of the individual replicas, of the other object. Objects communicate by use of any or all of synchronous request messages, synchronous reply messages, asynchronous request messages, asynchronous reply messages or one-way messages. An object can process messages in an order determined by priority, deadline, fairness, availability of resources or other message scheduling criteria not dependent solely on the order in which messages are generated, transmitted or received. The primary replica of an object generates and multicasts announcements that report the order in which it has processed, or is processing, messages. Backup replicas of an object process messages in the order specified in the announcements that contain the message ordering information that the primary replica generates and multicasts.

In one embodiment of the invention, the primary replica of an object multicasts to the backup replicas of the object an announcement of the ordering of a message piggybacked on a synchronous request message, synchronous reply message, asynchronous request message, asynchronous reply message or one-way message, if such an application message is available, to avoid transmitting additional messages containing such an announcement. Here, the primary replica of an object multicasts announcements of the ordering of several messages in a single message. The primary replica of an object multicasts to the backup replicas of the object an announcement of the ordering of a message piggybacked on the first synchronous request message, synchronous reply message, asynchronous request message, asynchronous reply message, one-way message or other message that the primary replica multicasts after it has processed, or while it is processing, said message. The primary replica of an object multicasts announcements of the ordering of several messages in a single message. If no application message is available, the primary replica of an object multicasts an announcement of the ordering of a message in a null message. The primary replica of an object multicasts announcements of the ordering of several messages in a single message.

In another embodiment of the invention, a primary replica or a backup replica of an object processes a synchronous reply message without waiting to transmit or receive other messages and without generating, or waiting for, an announcement of the order in which to process the reply message. Here, the primary replica of an object multicasts to the backup replicas of the object an announcement of the ordering of a message piggybacked on a synchronous request message, synchronous reply message, asynchronous request message, asynchronous reply message or one-way message, if such an application message is available, to avoid transmitting additional messages containing such an announcement. The primary replica of an object multicasts announcements of the ordering of several messages in a single message. The primary replica of an object multicasts to the backup replicas of the object an announcement of the ordering of a message piggybacked on the first synchronous request message, synchronous reply message, asynchronous request message, asynchronous reply message, one-way message or other message that the primary replica multicasts after it has processed, or while it is processing, said message. The primary replica of an object multicasts announcements of the ordering of several messages in a single message. If no application message is available, the primary replica of an object multicasts an announcement of the ordering of a message in a null message. The primary replica of an object multicasts announcements of the ordering of several messages in a single message.

In a further embodiment of the invention, the primary replica of an object can process a synchronous request message, asynchronous request message, asynchronous reply message or one-way message before it generates and multicasts an announcement of the order in which to process that message, if such processing is consistent with sequence number order, reception order, priority, deadline, fairness, availability of resources or other message scheduling criteria. Here, the primary replica of an object multicasts to the backup replicas of the object an announcement of the ordering of a message piggybacked on a synchronous request message, synchronous reply message, asynchronous request message, asynchronous reply message or one-way message, if such an application message is available, to avoid transmitting additional messages containing such an announcement. The primary replica of an object multicasts announcements of the ordering of several messages in a single message. The primary replica of an object multicasts to the backup replicas of the object an announcement of the ordering of a message piggybacked on the first synchronous request message, synchronous reply message, asynchronous request message, asynchronous reply message, one-way message or other message that the primary replica multicasts after it has processed, or while it is processing, said message. The primary replica of an object multicasts announcements of the ordering of several messages in a single message. If no application message is available, the primary replica of an object multicasts an announcement of the ordering of a message in a null message. The primary replica of an object multicasts announcements of the ordering of several messages in a single message.

In another embodiment of the invention, the primary replica of an object transmits a message containing the announcement of the ordering of a message over any multicast connection of which said primary replica is a participant. Here, the backup replicas of an object receive messages, multicast by the primary replica of the object, containing announcements of the ordering of messages, and in which the backup replicas of the object process those messages in the order specified by said announcements.

In one mode of the foregoing embodiment, the primary replica of an object processes messages in the order specified in its announcements and the backup replicas of the object process messages in the order specified in the announcements that they received from the primary, so that the primary replica and the backup replicas process the same messages in the same order. If the primary replica of a second object processes request messages from the primary replica of a first object, and if the primary replica of the second object multicasts a reply to the replicas of the first object, and if the primary replica of the second object fails so that a backup replica of the second object assumes the role of the primary, then said backup replica can obtain, from one of the other replicas of the second object or from one of the replicas of the first object, the messages and announcements of the ordering of those messages, so that said backup replica can process the same messages in the same order as the primary replica processed those messages before it failed.

In another mode of the foregoing embodiment, the primary replica of a first object multicasts a message containing a method invocation of a second object, the primary replica of the second object includes an announcement of the ordering of said message in a message that it multicasts to the replicas of the first object, and the primary replica of that first object includes said announcement in a message that it multicasts to the replicas of the second object. The backup replicas of the second object receive messages multicast by the primary replica of that first object, containing announcements of the ordering of messages, that the replicas of the first object received from the primary replica of the second object, which generated said announcements and piggybacked those announcements in messages that it multicast to the replicas of the first object. The primary replica of an object processes messages in the order specified in its announcements and the backup replicas of the object process messages in the order specified in the announcements that they received from the primary, so that the primary replica and the backup replicas process the same messages in the same order. If the primary replica of a second object processes request messages from the primary replica of a first object, and if the primary replica of the second object multicasts a reply to the replicas of the first object, and if the primary replica of the second object fails so that a backup replica of the second object assumes the role of the primary, then said backup replica can obtain, from one of the other replicas of the second object or from one of the replicas of the first object, the messages and announcements of the ordering of those messages, so that said backup replica can process the same messages in the same order as the primary replica processed those messages before it failed.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for replicating application program objects using semi-active or passive replication, wherein replicas of said objects are distributed across a plurality of networked computers for fault tolerance, said method comprising:

creating a primary replica of an object and one or more backup replicas of said object; and communicating message ordering information from said primary replica to said backup replicas for achieving consistent message ordering among said primary and backup replicas;

wherein said communication of message ordering information to said backup replicas can occur after said primary replica has started processing said messages, and either before or concurrently with the transmission by said primary replica of its next message; and wherein said communication of message ordering information may be achieved without the transmission of additional messages beyond those required for operation of the network computers without fault tolerance.

2. A method as recited in claim 1, wherein said primary replica processes messages selected from the set of messages consisting essentially of synchronous requests, synchronous replies, asynchronous requests, asynchronous replies and one-way messages.

3. A method as recited in claim 2, wherein said messages are selected from the set of messages consisting essentially of TCP messages, SCTP messages, UDP messages, and remote procedure calls.

4. A method as recited in claim 1:

wherein a primary server replica processes requests received from a primary client replica in an order determined by a criterion selected from a set of message scheduling criteria consisting essentially of sequence number order, reception order, priority, deadline, fairness, and availability of resources; and wherein said primary server replica generates message ordering information corresponding to the order in which it processes messages.

5. A method for replicating application program objects using semi-active or passive replication, wherein replicas of said objects are distributed across a plurality of networked computers for fault tolerance, said method comprising:

creating a primary replica of an object and one or more backup replicas of said object; and communicating message ordering information from said primary replica to said backup replicas for achieving consistent message ordering among said primary and backup replicas;

wherein said primary replica piggybacks message ordering information on its messages and multicasts those messages to source object replicas and destination object replicas.

6. A method for replicating application program objects using semi-active or passive replication, wherein replicas of said objects are distributed across a plurality of networked computers for fault tolerance, said method comprising:

creating a primary replica of an object and one or more backup replicas of said object; and communicating message ordering information from said primary replica to said backup replicas for achieving consistent message ordering among said primary and backup replicas;

wherein said primary replica piggybacks message ordering information on its messages and multicasts those messages to destination object replicas;

wherein said destination object has a primary replica; and wherein said primary replica of said destination object piggybacks said message ordering information on its messages and multicasts those messages to source object replicas.

7. A method as recited in claim 5 or 6, wherein said primary replica processes messages selected from the set of messages consisting essentially of synchronous requests, synchronous replies, asynchronous requests, asynchronous replies and one-way messages.

8. A method as recited in claim 7, wherein said messages are selected from the set of messages consisting essentially of TCP messages, SCTP messages, UDP messages, and remote procedure calls.

9. A method as recited in claim 5 or 6:

wherein a primary server replica processes requests received from a primary client replica in an order determined by a criterion selected from a set of message scheduling criteria consisting essentially of sequence number order, reception order, priority, deadline, fairness, and availability of resources; and wherein said primary server replica generates message ordering information corresponding to the order in which it processes messages.

10. A fault-tolerant computer system, wherein application program objects are replicated using semi-active or passive replication and distributed across a plurality of networked computers, said system comprising:

application program object replication software executable on one or more networked computers in said system; and means associated with said replication software for communication of message ordering information from a primary replica to one or more backup replicas and for achieving consistent message ordering among said primary and backup replicas;

wherein said communication of message ordering information to said backup replicas, either directly or indirectly, can occur after said primary replica has started processing said messages, and either before or concurrently with the transmission by said primary replica of its next message; and wherein said communication of message ordering information may be achieved without the transmission of additional messages beyond those required for operation of said application program objects without fault tolerance.

11. A computer system as recited in claim 10, wherein said primary replica processes messages selected from the set of messages consisting essentially of synchronous requests, synchronous replies, asynchronous requests, asynchronous replies and one-way messages.

12. A computer system as recited in claim 11, wherein said messages are selected from the set of messages consisting essentially of TCP messages, SCTP messages, UDP messages, and remote procedure calls.

13. A computer system as recited in claim 10, wherein a primary server replica processes requests received from a primary client replica in an order determined by a criterion selected from the set of message scheduling criteria consisting essentially of sequence number order, reception order, priority, deadline, fairness, and availability of resources; and wherein said primary server replica generates message ordering information corresponding to the order in which it processes messages.

14. A computer system as recited in claim 10, wherein said primary replica piggybacks message ordering information on its messages and multicasts those messages to destination object replicas;

wherein said destination object has a primary replica;

and wherein said primary replica of said destination object piggybacks said message ordering information on its messages and multicasts those messages to source object replicas.

15. A fault-tolerant computer system, wherein application program objects are replicated using semi-active or passive replication and distributed across a plurality of networked computers, said system comprising:

application program object replication software executable on one or more networked computers in said system; and means associated with said replication software for communication of message ordering information from a primary replica to one or more backup replicas and for achieving consistent message ordering among said primary and backup replicas;

wherein said primary replica piggybacks message ordering information on its messages and multicasts those messages to source object replicas and destination object replicas.

16. A fault-tolerant computer system, wherein application program objects are replicated using semi-active or passive replication and distributed across a plurality of networked computers, said system comprising:

application program object replication software executable on one or more networked computers in said system; and means associated with said replication software for communication of message ordering information from a primary replica to one or more backup replicas and for achieving consistent message ordering among said primary and backup replicas;

wherein said communication of message ordering information to said backup replicas, either directly or indirectly, can occur after said primary replica has started processing said messages, and either before or concurrently with the transmission by said primary replica of its next message; and wherein said communication of message ordering information may be achieved without the transmission of additional messages beyond those required for operation of said application program objects without fault tolerance.

17. A computer system as recited in claim 16, wherein said primary replica processes messages selected from the set of messages consisting essentially of synchronous requests, synchronous replies, asynchronous requests, asynchronous replies and one-way messages.

18. A computer system as recited in claim 17, wherein said messages are selected from the set of messages consisting essentially of TCP messages, SCTP messages, UDP messages, and remote procedure calls.

19. A computer system as recited in claim 16:
wherein a primary server replica processes requests received from a primary client replica in an order determined by a criterion selected from the set of message scheduling criteria consisting essentially of sequence number order, reception order, priority, deadline, fairness, and availability of resources; and
wherein said primary server replica generates message ordering information corresponding to the order in which it processes messages.

20. A computer system as recited in claim 16, wherein said primary replica piggybacks message ordering information on its messages and multicasts those messages to source object replicas and destination object replicas.

21. A computer system as recited in claim 16, wherein said primary replica piggybacks message ordering information on its messages and multicasts those messages to destination object replicas;
wherein said destination object has a primary replica; and
wherein said primary replica of said destination object piggybacks said message ordering information on its messages and multicasts those messages to source object replicas.

22. A computer program stored on a computer readable medium and executable on one or more computers in a system of networked computers wherein application program objects are replicated using semi-active or passive replication and distributed across a plurality of said networked computers for fault tolerance, said program comprising:
instructions for communication of message ordering information from a primary replica of an object to backup replicas of said object for achieving consistent message ordering among said primary and backup replicas;
wherein said communication of message ordering information to said backup replicas, either directly or indirectly, can occur after said primary replica has started processing said messages, and either before or concurrently with the transmission by said primary replica of its next message; and
wherein said communication of message ordering information may be achieved without the transmission of additional messages beyond those required for operation of said application program objects without fault tolerance.

23. A computer program as recited in claim 22, wherein said primary replica processes messages selected from the set of messages consisting essentially of synchronous requests, synchronous replies, asynchronous requests, asynchronous replies and one-way messages.

24. A computer program as recited in claim 23, wherein said messages are selected from the set of messages consisting essentially of TCP messages, UDP messages, SCTP messages and remote procedure calls.

25. A computer program as recited in claim 22:
wherein a primary server replica processes requests received from a primary client replica in an order determined by a criterion selected from the set of criteria consisting essentially of sequence number order, reception order, priority, deadline, fairness, and availability of resources; and
wherein said primary server replica generates message ordering information corresponding to the order in which it processes messages.

26. A computer program as recited in claim 22, wherein said primary replica piggybacks message ordering information on its messages and multicasts those messages to source object replicas and destination object replicas.

27. A computer program as recited in claim 22, wherein said primary replica piggybacks message ordering information on its messages and multicasts those messages to destination object replicas;
wherein said destination object has a primary replica;
and wherein said primary replica of said destination object piggybacks said message ordering information on its messages and multicasts those messages to source object replicas.

28. A computer program stored on a computer readable medium and executable on one or more computers in a system of networked computers wherein application program objects are replicated using semi-active or passive replication and distributed across a plurality of said networked computers for fault tolerance, said program comprising:
a plurality of executable procedures configured to exploit multicast communication to achieve fault tolerance using semi-active or passive replication of objects with a primary replica and one or more backup replicas, and to maintain a consistent message delivery order across the replicas of an object to achieve strong replica consistency, despite asynchronous message reception, message loss and failure of the replicas, without requiring additional messages in fault-free conditions beyond those required in a system without replication.

29. A computer program as recited in claim 28, wherein wrapping and library interpositioning are used to divert messages from standard protocol stacks to said procedures so that application programs can be rendered fault-tolerant without modification to said application programs.

30. A computer program as recited in claim 29, wherein a primary replica of an object can receive and process a first message, and can multicast further messages as a result of processing said first message, prior to announcing an order for said first message so that, in fault-free conditions, the end-to-end request/response time is not degraded by the need to transmit additional messages, or to wait for reception of additional messages, over and above the messages required in a system without replication.

31. A computer program as recited in claim 30, wherein for each pair of replicated objects between which messages are to be communicated, a multicast connection is established and every message multicast on said connection by a replica of a first object of said pair of objects is delivered to each replica of both objects, or to each replica of the second object of said pair of objects.

32. A computer program as recited in claim 31, wherein replicas of each object that participates in the multicast connection requires no knowledge of the number of replicas, or of the individual replicas, of the other object.

33. A computer program as recited in claim 32, wherein objects communicate by use of any or all of synchronous request messages, synchronous reply messages, asynchronous request messages, asynchronous reply messages or one-way messages.

34. A computer program as recited in claim 33, wherein an object can process messages in an order determined by priority, deadline, fairness, availability of resources or other message scheduling criteria not dependent solely on the order in which messages are generated, transmitted or received.

35. A computer program as recited in claim 34, wherein said primary replica of an object generates and multicasts announcements that report the order in which it has processed, or is processing, messages.

36. A computer program as recited in claim 35, wherein backup replicas of an object process messages in the order specified in said announcements that said primary replica generates and multicasts.

37. A computer program as recited in claim 36, wherein said primary replica of an object multicasts to said backup replicas of said object an announcement of the ordering of a message piggybacked on a synchronous request message, synchronous reply message, asynchronous request message, asynchronous reply message or one-way message, if such an application message is available, to avoid transmitting additional messages containing said announcement.

38. A computer program as recited in claim 37, wherein said primary replica of an object multicasts said announcements of the ordering of several messages in a single message.

39. A computer program as recited in claim 37, wherein said primary replica of an object multicasts to said backup replicas of said object said announcement of the ordering of a message piggybacked on the first synchronous request message, synchronous reply message, asynchronous request message, asynchronous reply message, one-way message or other message that said primary replica multicasts after it has processed, or while it is processing, said message.

40. A computer program as recited in claim 39, wherein said primary replica of an object multicasts said announcements of the ordering of several messages in a single message.

41. A computer program as recited in claim 40, wherein if no application message is available, said primary replica of an object multicasts said announcement of the ordering of a message in a null message.

42. A computer program as recited in claim 41, wherein said primary replica of an object multicasts said announcements of the ordering of several messages in a single message.

43. A computer program as recited in claim 36, wherein said primary replica or backup replica of an object can process a synchronous reply message without waiting to transmit or receive other messages and without generating, or waiting for, an announcement of the order in which to process the reply message.

44. A computer program as recited in claim 43, wherein said primary replica of an object multicasts to said backup replicas of said object said announcement of the ordering of a message piggybacked on a synchronous request message, synchronous reply message, asynchronous request message, asynchronous reply message or one-way message, if such an application message is available, to avoid transmitting additional messages containing said announcement.

45. A computer program as recited in claim 44, wherein said primary replica of an object multicasts announcements of the ordering of several messages in a single message.

46. A computer program as recited in claim 44, wherein said primary replica of an object multicasts to said backup replicas of said object said announcement of the ordering of a message piggybacked on the first synchronous request message, synchronous reply message, asynchronous request message, asynchronous reply message, one-way message or other message that said primary replica multicasts after it has processed, or while it is processing, said message.

47. A computer program as recited in claim 46, wherein said primary replica of an object multicasts announcements of the ordering of several messages in a single message.

48. A computer program as recited in claim 47, wherein if no application message is available, said primary replica of an object multicasts an announcement of the ordering of a message in a null message.

49. A computer program as recited in claim 48, wherein said primary replica of an object multicasts said announcements of the ordering of several messages in a single message.

50. A computer program as recited in claim 36, wherein said primary replica of an object can process a synchronous request message, asynchronous request message, asynchronous reply message or one-way message before it generates and multicasts said announcement of the order in which to process that message, if such processing is consistent with sequence number order, reception order, priority, deadline, fairness, availability of resources or other message scheduling criteria.

51. A computer program as recited in claim 50, wherein said primary replica of an object multicasts to said backup replicas of said object said announcement of the ordering of a message piggybacked on a synchronous request message, synchronous reply message, asynchronous request message, asynchronous reply message or one-way message, if such an application message is available, to avoid transmitting additional messages containing said announcement.

52. A computer program as recited in claim 51, wherein said primary replica of an object multicasts announcements of the ordering of several messages in a single message.

53. A computer program as recited in claim 51, wherein said primary replica of an object multicasts to said backup replicas of the object said announcement of the ordering of a message piggybacked on the first synchronous request message, synchronous reply message, asynchronous request message, asynchronous reply message, one-way message or other message that said primary replica multicasts after it has processed, or while it is processing, said message.

54. A computer program as recited in claim 53, wherein said primary replica of an object multicasts announcements of the ordering of several messages in a single message.

55. A computer program as recited in claim 53, wherein if no application message is available, said primary replica of an object multicasts said announcement of the ordering of a message in a null message.

56. A computer program as recited in claim 55, wherein said primary replica of an object multicasts said announcements of the ordering of several messages in a single message.

57. A computer program as recited in claim 36, wherein said primary replica of an object transmits a message containing the announcement of the ordering of a message over any multicast connection of which said primary replica is a participant.

58. A computer program as recited in claim 57, wherein said backup replicas of an object receive messages, multicast by said primary replica of said object, containing announcements of the ordering of messages, and in which said backup replicas of said object process those messages in the order specified by said announcements.

59. A computer program as recited in claim 58, wherein said primary replica of an object processes messages in the order specified in its announcements and said backup replicas of said object process messages in the order specified in the announcements that they received from said primary replica, so that said primary replica and said backup replicas process the same messages in the same order.

60. A computer program as recited in claim 59, wherein if the primary replica of a second object processes request messages from the primary replica of a first object, and if said primary replica of said second object multicasts a reply to the replicas of said first object, and if said primary replica of said second object fails so that a backup replica of said second object assumes the role of the primary, then said backup replica can obtain, from one of the other replicas of said second object or from one of the replicas of said first object, the messages and announcements of the ordering of those messages, so that said backup replica can process the same messages in the same order as said primary replica processed those messages before it failed.

61. A computer program as recited in claim 58, wherein the primary replica of a first object multicasts a message containing a method invocation of a second object, the primary replica of said second object includes an announcement of the ordering of said message in a message that it multicasts to the replicas of said first object, and said primary replica of said first object includes said announcement in a message that it multicasts to the replicas of said second object.

62. A computer program as recited in claim 61, wherein the backup replicas of said second object receive messages multicast by said primary replica of said first object, containing announcements of the ordering of messages, that the replicas of said first object received from said primary replica of said second object, which generated said announcements and piggybacked those announcements in messages that it multicast to the replicas of said first object.

63. A computer program as recited in claim 62, wherein the primary replica of an object processes messages in the order specified in its announcements and the backup replicas of said object process messages in the order specified in the announcements that they received from said primary, so that said primary replica and said backup replicas process the same messages in the same order.

64. A computer program as recited in claim 63, wherein if said primary replica of said second object processes request messages from said primary replica of said first object, and if said primary replica of said second object multicasts a reply to the replicas of said first object, and if said primary replica of said second object fails so that a backup replica of said second object assumes the role of the primary, then said backup replica can obtain, from one of the other replicas of said second object or from one of the replicas of said first object, the messages and announcements of the ordering of those messages, so that said backup replica can process the same messages in the same order as said primary replica processed those messages before it failed.

* * * * *